(12) United States Patent
Satou et al.

(10) Patent No.: US 8,196,722 B2
(45) Date of Patent: Jun. 12, 2012

(54) DAMPER

(75) Inventors: Masahiro Satou, Shizuoka (JP); Seiji Sawai, Shizuoka (JP); Yutaka Yamazaki, Shizuoka (JP); Katsuhiro Kondou, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 968 days.

(21) Appl. No.: 12/091,958

(22) PCT Filed: Oct. 30, 2006

(86) PCT No.: PCT/JP2006/321614
§ 371 (c)(1),
(2), (4) Date: May 19, 2008

(87) PCT Pub. No.: WO2007/052581
PCT Pub. Date: May 10, 2007

(65) Prior Publication Data
US 2009/0283373 A1  Nov. 19, 2009

(30) Foreign Application Priority Data
Oct. 31, 2005  (JP) .................................. 2005-317581

(51) Int. Cl.
*F16F 9/00* (2006.01)
(52) U.S. Cl. ..................... 188/312; 188/313; 188/319.1; 267/64.18; 267/64.26
(58) Field of Classification Search ............... 188/319.1, 188/312, 313, 316, 322.15; 267/34, 64.18, 267/221, 64.26
See application file for complete search history.

(56) References Cited

U.S. PATENT DOCUMENTS

| | | | | |
|---|---|---|---|---|
| 3,131,921 A | * | 5/1964 | Karbowniczek | 267/128 |
| 3,638,885 A | * | 2/1972 | Reed | 244/17.27 |
| 3,656,633 A | * | 4/1972 | Ostwald | 213/43 |
| 5,491,938 A | * | 2/1996 | Niwa et al. | 52/167.1 |
| 6,279,703 B1 | * | 8/2001 | Mete | 188/319.1 |

(Continued)

FOREIGN PATENT DOCUMENTS
JP            49-113339 U    9/1974
(Continued)

OTHER PUBLICATIONS

Official communication issued in counterpart International Application No. PCT/JP2006/321614, mailed on Jan. 16, 2007.

(Continued)

*Primary Examiner* — Robert A Siconolfi
*Assistant Examiner* — Mariano Sy
(74) *Attorney, Agent, or Firm* — Keating & Bennett, LLP

(57) ABSTRACT

A damper includes a cylinder tube having a first end connected to one portion of a member of an object for damping, and a fixing rod guide arranged to close a second end of the cylinder tube; a movable rod guide fitted on the first end of the cylinder tube; a main piston rod extending from the piston side, the piston fitted in the cylinder tube and passing through the fixing rod guide; a sub-piston rod extending on the piston side and passing through the movable rod guide; and a spring normally biasing the movable rod guide toward the piston. A damping force generation oil passage is arranged to connect first and second oil chambers in a cylinder tube defined by the piston. The number of parts of a through-rod type damper is reduced to simplify a construction thereof and to make the damper compact.

6 Claims, 13 Drawing Sheets

U.S. PATENT DOCUMENTS

| | | | |
|---|---|---|---|
| 6,454,206 B2 * | 9/2002 | Vincent | 244/17.27 |
| 6,789,652 B2 * | 9/2004 | Honig et al. | 188/312 |
| 7,017,720 B2 * | 3/2006 | Yoshimoto | 188/315 |
| 7,314,124 B2 * | 1/2008 | Martyn et al. | 188/318 |
| 7,540,480 B2 * | 6/2009 | Sawai et al. | 267/221 |

FOREIGN PATENT DOCUMENTS

| | | |
|---|---|---|
| JP | 50-117294 U | 9/1975 |
| JP | 04-25047 U | 2/1992 |
| JP | 11-022775 A | 1/1999 |
| JP | 11-165521 A | 6/1999 |

OTHER PUBLICATIONS

Sawai et al.; "Hydraulic Shock Absorber"; U.S. Appl. No. 12/045,817, filed Mar. 11, 2008.

* cited by examiner

DAMPER

BACKGROUND OF THE INVENTION

1. Field of the Invention

The present invention relates to a damper which damps impact forces applied to a member as an object for damping, such as a suspension system of a vehicle.

2. Description of the Related Art

Usually, a damper is suspended between a vehicle body side and a wheel side of a suspension system of a vehicle. Generally, the damper is provided with a cylinder tube connected to either one of the vehicle body side and the wheel side of the system, a free piston axially and slidably fitted in the cylinder tube to divide the inside of the cylinder tube into an oil chamber filled with oil and a gas chamber filled with gas, a piston axially and slidably fitted in the cylinder tube to divide the oil chamber into a first oil chamber and a second oil chamber, and a piston rod extending axially from the piston in a direction opposite to the gas chamber with the extending section being connected to the opposite side of the suspension system. Further, a small oil passage with a small cross section is provided in the piston.

When an impact force is applied externally to the suspension system, the damper is expanded and contracted, causing the oil to flow through the small oil passage between the first and the second oil chambers. Consequently, a damping force is generated, and the impact force is relaxed.

When the damper is expanded as described above, the piston rod is pulled outwardly. At this time, the capacity of the cylinder tube is decreased, and bubbles tend to occur in the oil present in the oil chamber. In other words, "cavitation," which may give a negative effect to a damping force characteristic of the damper, tends to occur in the oil chamber. In this case, however, the free piston is pushed toward the oil chamber by gas pressure in the gas chamber. Thus, an occurrence of the cavitation is prevented.

Of both surfaces of the piston of the damper, one surface on a piston rod extension side has a pressure receiving surface area smaller than that of the other surface by a surface area corresponding to the connection of the piston rod with the piston. Accordingly, due to oil pressure generated in the oil chamber resulting from the gas pressure, the piston pushes and moves the piston rod outward of the cylinder tube. In other words, the damper starts to expand. Such an expansion of the damper always causes the vehicle body side and the wheel side to move away from each other and may deteriorate ride comfort of the vehicle. Therefore, such an expansion is not preferable.

To avoid such a drawback, conventionally, a damper of a through-rod type (a double rod type) provided with a pair of piston rods was disclosed in JP-A-Hei11-165521, for example.

According JP-A-Hei11-165521, the damper is installed between an axle arm and an end of a stabilizer of a vehicle. The damper includes a cylinder tube connected to the axle arm; a fixing rod guide for closing one end of the cylinder tube; another fixing rod guide fitted in the other end of the cylinder tube; a piston axially and slidably fitted in a middle section in the axial direction of the cylinder tube; a main piston rod extending on the piston side, passing through the one fixing rod guide, and connected to the end of the stabilizer; and a sub-piston rod extending on the piston side and passing through the other fixing rod guide.

A first oil chamber is defined between the one fixing rod guide and the piston. Further, there is also a second oil chamber defined between the other fixing rod guide and the piston. Small oil passages with a small cross section arranged to connect the first and the second oil chambers are formed in the piston and the piston rod. In addition, there is provided a gas reservoir which reserves high-pressure gas and normally pressurizes the oil in the first and the second oil chambers via a free piston displaced by gas pressure thereof.

For example, when an impact force is applied to the damper via the axle arm, the cylinder tube and respective piston rods relatively move. Accordingly, when the damper expands or contracts, the oil flows through the small oil passage between the first and the second oil chambers. Consequently, damping force is generated, and the impact force is damped. As a result, a tendency to generate vibrations between the axle arm and the stabilizer is decelerated.

The main piston rod and the sub-piston rod have the same diameter. Accordingly, the pressure receiving surface areas on both sides of the piston are kept equal to each other. Consequently, it is prevented that the piston rod is, as described above, pushed out of the cylinder tube because of gas pressure. Further, while the damper is operated, the total capacity of the first and the second oil chamber does not vary. Therefore, it is prevented that the oil pressure is unnecessarily increased according to the operation described above. On the other hand, if the volume of the oil varies due to a temperature change, such variance in the volume is smoothly mitigated by a volume change resulting from compressibility of the gas. As a result, it is further prevented that the oil pressure is unnecessarily increased.

In addition, the oil is normally pressurized by the gas pressure. Accordingly, when the damper is operated, or when the volume of the oil varies according to a temperature change, it is prevented that cavitation tends to occur in the first and the second oil chambers. Consequently, the damping force characteristic of the damper is kept excellent.

Further, the damper is provided with a regulating valve which makes it possible to adjust the opening of the small oil passage provided on the axial center of the sub-piston rod and an operating rod fitted in an axial center hole formed on the axial center of the main piston rod, having one end connected to the regulating valve, and having the other end as an operating section operable outside of the one end of the cylinder tube.

In conjunction with operation of the operating section, the regulating valve is operated via the operating rod to adjust the opening of the small oil passage. Because of this adjustment, the damping force characteristic of the damper becomes variable.

However, the damper has a problem, which will be described herein after.

Firstly, the damper is provided with the gas reservoir having the free piston separately from the cylinder. Therefore, there are a large number of parts. Accordingly, the construction of the damper is complicated. Moreover, since the cylinder tube and the gas reservoir are disposed in parallel, the whole shape of the damper tends to become larger.

Secondly, a connecting section is provided on the other end of the cylinder tube to connect the cylinder tube and the axle arm. Moreover, the cylinder tube containing a trajectory of the sub-piston rod at a time when the damper is contracted and the connecting section are provided in parallel in the axial direction of the damper. Accordingly, the total length of the damper tends to be long.

On the other hand, extra space available in a vehicle is narrow in general. Accordingly, if the damper is provided in such a space, it is difficult to make the total length thereof sufficiently long. Thus, a piston stroke during operation is restricted to be short. As a result, the damper may not sufficiently damp impact forces when the vehicle passes a very rough portion on the road.

Thirdly, the damper has the operating rod fitted in the axial center hole formed on the axial center of the main piston rod as described above. Further, the operating section of the operating rod is operable from the outside area of the one end of the cylinder tube.

However, it is possible that an operation needs to be performed from an outside area of the other end of the cylinder tube depending on a mounting condition of the damper. Notwithstanding this, the connecting section is formed on the other end of the cylinder tube as described above. Consequently, such operation from the outside area of the other end of the cylinder tube as described above cannot be performed because the connecting section is obstructed. In other words, there is a problem in which the degree of freedom is low in relation to an operation of the damper for obtaining a desired damping force characteristic.

SUMMARY OF THE INVENTION

In order to overcome the problems described above, preferred embodiments of the present invention reduce the number of parts of a damper of the through-rod type, which is not negatively affected by gas pressure, to simplify the construction thereof and, and at the same time, to make the damper compact so as to improve the degree of freedom in relation to installation thereof.

Further, preferred embodiments of the present invention improve the degree of freedom in relation to the operation of the damper for obtaining a desired damping force characteristic.

A preferred embodiment of the present invention is directed to a damper including a cylinder tube having a first end connected to a first portion of a member to be damped; a fixing rod guide arranged to close a second end of the cylinder tube; a movable rod guide axially and slidably fitted in the cylinder tube at one end thereof; a piston axially and slidably fitted in a middle section of the cylinder tube in the axial direction thereof; a main piston rod extending from the piston, passing through the fixing rod guide, and connected to a second portion of the member; a sub-piston rod extending from the piston and passing through the movable rod guide; and a spring disposed coaxially with the cylinder tube and biasing the movable rod guide toward the piston, wherein a first oil chamber is defined between the fixing rod guide and the piston, a second oil chamber is defined between the movable rod guide and the piston, and a damping force generation oil passage connects the first and the second oil chambers.

In a preferred embodiment of the present invention, a connecting section connecting the first end of the cylinder tube to the first portion of the member may be provided at the first end of the cylinder tube, and another end of the sub-piston rod opposite to the piston may be movable into the connecting section.

Further, in a preferred embodiment of the present invention, the connecting section may be open, in the axial direction of the cylinder tube, to the outside of the first end of the cylinder tube.

Further, in a preferred embodiment of the present invention, an admission hole in which the other end of the sub-piston rod opposite to the piston is movable may be provided in the first portion of the member.

According to a preferred embodiment of the present invention, the damper may further include a regulating valve arranged to adjust the opening of the damping force generation oil passage provided on the axial center of the sub-piston rod and an operating rod fitted in the axial center hole provided on the axial center of the sub-piston rod, having one end connected to the regulating valve, and having the other end as an operating section. In addition, an operation hole for allowing the operating section to be operated outside of the first end of the cylinder tube may be provided on the first end of the cylinder tube.

Further, in a preferred embodiment of the present invention, a trajectory of the sub-piston rod when the damper is expanded or contracted may be contained in a space in the cylinder tube.

Further, in a preferred embodiment of the present invention, the spring may be a coil spring, and a trajectory of the sub-piston rod when the damper is expanded or contracted may be contained in an internal space of the spring.

Further, in a preferred embodiment of the present invention, a slider having a predetermined length in the axial direction of the cylinder tube and axially and slidably fitted in the cylinder tube may be interposed between the movable rod guide and the spring.

Various benefits and advantages of the preferred embodiments of the present invention are described herein after.

A preferred embodiment of the present invention includes the cylinder tube having a first end connected to a first portion of a member for damping; the fixing rod guide closing the second end of the cylinder tube; the movable rod guide axially and slidably fitted on the first end of the cylinder tube; the piston axially and slidably fitted in the middle section in the axial direction of the cylinder tube; the main piston rod extending from the piston, passing through the fixing rod guide, and connected to a second portion of the member; the sub-piston rod extending from the piston and passing through the movable rod guide; and the spring disposed coaxially with the cylinder tube and normally biasing the movable rod guide toward the piston. In addition, the first oil chamber is defined between the fixing rod guide and the piston, the second oil chamber is between the movable rod guide and the piston, and the damping force generation oil passage is provided for connecting the first and the second oil chambers.

Accordingly, the oil is normally biased by the spring via the movable rod guide. Consequently, while the damper is operated, it is prevented that cavitation is caused by a decrease of pressure in the first and the second oil chambers. Consequently, an excellent damping force characteristic of the damper is maintained. On the other hand, even if a temperature change in the oil causes a volume change in the oil, the bias of the spring maintains a certain pressurized state of the oil. As a result, the excellent damping force characteristic of the damper is further maintained.

The movable rod guide is preferably used to close the cylinder tube on the second end thereof and also used for transmitting the biasing force of the spring to the oil. In other words, it is also used as the free piston as referred to in the conventional art. Consequently, the number of parts in the damper is correspondingly decreased, and the construction of the damper is simplified.

Moreover, as described above, the spring is disposed coaxially with the cylinder tube. Accordingly, it is possible to make the damper more compact than the damper of the conventional art, in which the gas reservoir for pressurizing the oil is disposed outward in the radial direction to be parallel to the cylinder tube. Consequently, the degree of freedom in installation of the damper can be improved.

In a preferred embodiment of the present invention, the connecting section connecting the first end of the cylinder tube and the first portion of the member may be provided on the first end of the cylinder tube, and the end of the sub piston opposite to the piston may move in the connecting section.

In this manner, the internal space of the connecting section is used as a space for containing the trajectory of the sub-piston rod when the damper is contracted.

Consequently, firstly, it is possible to make the damper more compact than that in a case in which the cylinder tube containing the trajectory of the sub-piston rod and the connecting section are simply in parallel in the axial direction of the damper. Therefore, the degree of freedom in installation thereof is improved. In addition, secondly, for example, even when the damper is mounted on a vehicle which has a narrow extra space, the stroke of the piston of the damper can be made as long as possible because the damper is compact. Consequently, it is possible to follow very rough roads.

Further, in a preferred embodiment of the present invention, the inside of the connecting section may be opened in the axial direction of the cylinder tube toward the outside of the first end of the cylinder tube.

In this manner, in addition to the internal space of the connecting section described above, the space outside the end of the connecting section in the axial direction of the cylinder tube can be used as a space for movement of the sub-piston rod when the damper is contracted. Consequently, the stroke of the damper can be made even longer.

Further, in a preferred embodiment of the present invention, the admission hole in which the end of the sub piston rod opposite to the piston moves may be provided on the first portion of the member.

In this manner, the space of the admission hole is used as a space for containing the trajectory of the sub-piston rod when the damper is contracted.

Consequently, firstly, it is possible to make an assembly of the damper and the first portion of the member more compact than that in a case in which the cylinder tube containing the trajectory of the sub-piston rod and the first portion of the member are simply in parallel in the axial direction of the damper. Therefore, the degree of freedom in installation of the assembly thereof is improved. Further, secondly, for example, even when the damper is mounted on a vehicle which has a narrow extra space, the stroke of the piston of the damper can be made as long as possible because the assembly thereof is compact. Consequently, it is possible to travel on very rough roads.

In a preferred embodiment of the present invention, the damper may further include a regulating valve arranged to adjust the opening of the damping force generation oil passage provided on the axial center of the sub-piston rod, and an operating rod fitted in the axial center hole provided on the axial center of the sub-piston rod and having one end connected to the regulating valve, and having the other end as an operating section. In addition, an operation hole to allow the operating section to be operated outside of the first end of the cylinder tube may be arranged on the first end of the cylinder tube.

In this manner, an operation of the operating section in a case that the regulating valve is adjusted can be easily performed from the outside area of the second end of the cylinder tube. Consequently, the degree of freedom in relation to an operation of the damper for obtaining a desired damping force characteristic is improved.

Further, in a preferred embodiment of the present invention, a trajectory of the sub piston rod when the damper is expanded or contracted may be contained in the space in the cylinder tube.

In this manner, when the damper mounted on the member is operated as described above, it is prevented, by the cylinder tube containing the trajectory of the sub-piston rod, that the sub-piston rod of the damper interferes with either portion of the member, for example, by coming in contact with either portion of the member. Consequently, mounting the damper on the member becomes easy because it is not necessary to consider the trajectory of the sub-piston rod.

Further, in a preferred embodiment of the present invention, the spring may be a coil spring, and a trajectory of the sub-piston rod when the damper is expanded or contracted may be contained in the space in the internal spring.

In this manner, it is possible to make the damper compact as much as possible because the internal space of the spring is used for the trajectory of the sub-piston rod. Consequently, the degree of freedom in installation of the damper can be improved.

Further, in a preferred embodiment of the present invention, the slider having the predetermined length in the axial direction of the cylinder tube and axially and slidably fitted in the cylinder tube may be interposed between the movable rod guide and the spring.

In this case, an axial end surface of the movable rod guide is usually arranged to be accurately orthogonal to the axial center of the movable rod guide. On the other hand, the spring deforms elastically itself. Accordingly, it is difficult in general to arrange the end surface in the axial direction to be accurately orthogonal to the axial center. Consequently, there tends to be an inclination on an orthogonal surface on the axial center.

Therefore, if the end surface of the spring is pressed directly against the end surface of the movable rod guide, the end surface of the spring tends to be unevenly in contact with the end surface of the movable rod guide. Consequently, as the end surface of the spring is pressed directly against the end surface of the movable rod guide, the movable rod guide, to which the biasing force of the spring is applied, tends to be inclined with respect to the axial center of the cylinder tube and, thus, slides in the cylinder tube in this state. This, however, is not preferable because smooth sliding of the movable rod guide relative to the cylinder tube is prevented.

With such a drawback considered, as described above, the slider having the predetermined length in the axial direction of the cylinder tube and axially and slidably fitted in the cylinder tube needs to be interposed between the movable rod guide and the spring. In this manner, even if the end surface of the spring is inclined to a degree, it is prevented that the slider is inclined with respect to the axial center of the cylinder tube.

Consequently, the movable rod guide in contact with the other end surface of the slider is not inclined. As a result, it is prevented that both of the slider and the movable rod guide are inclined with respect to the axial center of the cylinder tube. Accordingly, smooth sliding in the cylinder tube is secured.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
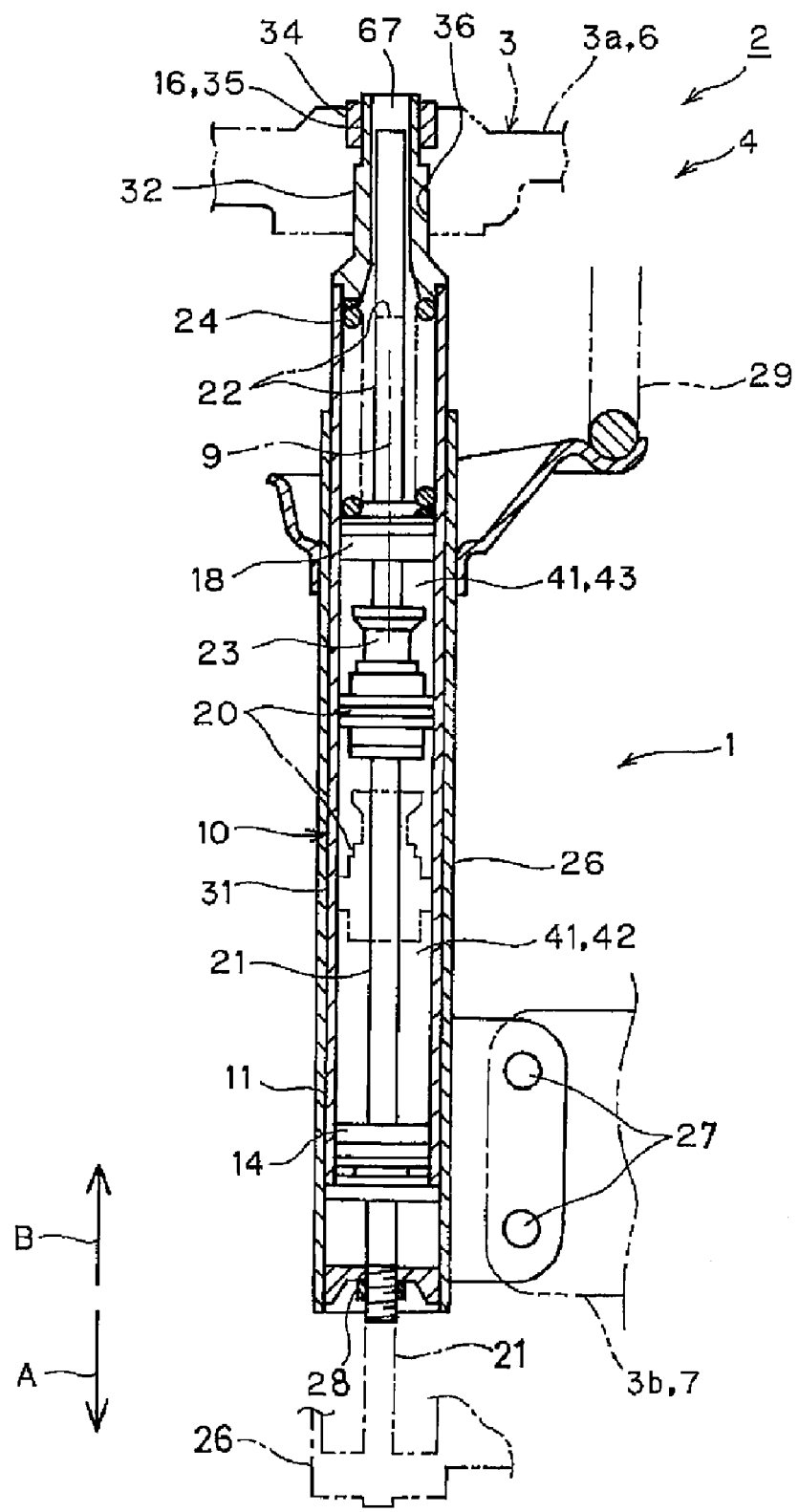
FIG. 1 is a vertical cross-sectional view of a damper according to a first preferred embodiment of the present invention.

Preferred embodiments of the present invention reduce the number of parts in the damper of a through-rod type, which is not negatively affected by gas pressure, simplify a construction thereof and, at the same time, make the damper compact so as to improve the degree of freedom in relation to installation thereof.

The damper is preferably provided with a cylinder tube having a first end connected to a first portion of a member as an object for damping; a fixing rod guide arranged to close a second end of the cylinder tube; a movable rod guide axially and slidably fitted on one end of the cylinder tube; a piston axially and slidably fitted in a middle section in the axial direction of the cylinder tube; a main piston rod extending on the piston side, passing through the fixing rod guide, and connected to the other end of the member; a sub-piston rod extending on the piston side and passing through the movable rod guide; and a spring disposed coaxially with the cylinder tube and normally biasing the movable rod guide toward the piston. Further, a first oil chamber is defined between the fixing rod guide and the piston, a second oil chamber is defined between the movable rod guide and the piston, and the damping force generation oil passage connects the first and the second oil chambers.

First Preferred Embodiment

A first preferred embodiment of the present invention will be described herein after in detail with reference to FIGS. 1 to 7.

FIGS. 1 to 4 illustrate a damper 1. The damper 1 is used as a shock absorber on a member 3 as an object for damping in a vehicle 2. For example, the member 3 is a suspension system 4 of a McPherson strut type for a front wheel suspension of an automobile.

The suspension system 4 is provided with an arm (not shown) vertically and swingably supported by a vehicle body 6 of the vehicle 2, a steering knuckle 7 supported by the arm and supporting a front wheel, and the damper 1 provided across a side of the vehicle body 6 side and the steering knuckle 7. The vehicle body 6 side corresponds to a first portion 3a of the member 3, and the steering knuckle 7 on a wheel side corresponds to a second portion 3b of the member 3.

The damper 1 is provided with a cylinder tube 10 having an axial center 9 extending vertically and a first end (an upper end) 16 connected to the first portion 3a of the member 3; a circlip 12 fitted in an annular groove 12a provided on an inner surface on a second end (a lower end) 11 of the cylinder tube 10; a fixing rod guide 14 fitted in the second end 11 to close the second end 11, fixed by the circlip 12, and having the axial center 9 in which a metal bushing 13 is pressed; and a movable rod guide 18 axially and slidably fitted on the second end 16 side of the cylinder tube 10 and having the axial center 9 along which a metal bushing 17 is press-fitted.

Further, the damper 1 is provided with a piston 20 having a piston ring 19 on an outer circumference thereof and axially and slidably fitted in a middle section in the axial direction of the cylinder 10; a main piston rod 21 connected to the piston 20, extending downward on the piston 20 side, and passing through the bushing 13 of the fixing rod guide 14; a sub-piston rod 22 extending upward on the piston 20 side and passing through the bushing 17 of the movable rod guide 18; and a fastener 23 connecting the main piston rod 21 and the sub-piston rod 22 with each other.

More specifically, an upper end of the main piston rod 21 is directly connected to the piston 20 by the fastener 23 and a circlip 25 as described below. On the other hand, a lower end of the sub-piston rod 22 is indirectly connected to the piston 20 via the upper end of the main piston rod 21 and the fastener 23.

Further, the damper 1 is provided with a coil spring 24 made of metal having a cross-section in the shape of a circle which normally biases the movable rod guide 18 toward the piston 20 side, and the circlip 25 fitted with the main piston rod 21 from an outside thereof and connecting the piston 20 to the main piston rod 21 in cooperation with the fastener 23. The spring 24 is contained entirely inside of the cylinder tube 10 on the first end 16 there of and disposed coaxially with the axial center 9.

Further, the damper 1 is provided with an outer tube 26 axially and slidably fitted in the cylinder tube 10 from an outside thereof, a fastener 27 connecting the outer tube 26 and the second portion 3b of the member 3, a fastener 28 connecting a lower end of the outer tube 26 to a lower end of the main piston rod 21, and a suspension spring 29 provided across the first portion 3a of the member 3 and the outer tube 26 and biasing the outer tube 26 to push the outer tube 26 with the main piston rod 21 downward away from the cylinder tube 10.

The damper 1 is enabled to perform an expansion operation A by the suspension spring 29, and the damper 1 is enabled to perform a contraction operation B in a direction opposite to the expansion operation A by an external force against the suspension spring 29.

The cylinder tube 10 is provided with a tube main body 31 defining the second end 11 side on the axial center 9 and internally having the fixing rod guide 14, the movable rod guide 18, and the piston 20; and a small diameter tube 32 defining the first end 16 side on the axial center 9 and connected to an upper end of the tube main body 31. An upper end of the small diameter tube 32 corresponds to the first end 16 of the cylinder tube 10. In addition, a connecting section 35 connecting the small diameter tube 32 and the first portion 3a of the member 3 by a fastener 34 is provided on the upper end of the small diameter tube 32.

Specifically, the first portion 3a of the member 3 is provided with a bracket 6a made of sheet metal supported on an upper section of a suspension tower in the vehicle body 6 by a fastener, an elastic body 6b in the shape of an annulus ring supported on a edge of a round opening provided in the bracket 6a, and a connecting plate 6c in the shape of an annulus ring preferably adhered by vulcanization and supported on an inner circumference of the elastic body 6b generally coaxially with the elastic body 6b.

The inner circumference of the elastic body 6b and the connecting plate 6c define an admission hole 36 formed in the first portion 3a. The connecting section 35 is fitted in the admission hole 36 generally coaxially with the admission hole 36. Further, the connecting section 35 is connected to the connecting plate 6c by the fastener 34. In other words, the upper end of the small diameter tube 32 is connected to slightly swing with respect to the suspension tower in the vehicle body 6 by the fastener 34, the connecting section 35, the connecting plate 6c, the elastic body 6b, and the bracket 6a.

An end (an upper end) of the sub-piston rod 22 opposite to the piston 20 can be moved in an inner hole (an internal space) of the connecting section 35 and the admission hole 36 respectively by the contraction operation B of the damper 1. In this case, an end surface of the upper end of the small diameter tube 32 may be connected with respect to a lower surface of the first portion 3a of the member 3 by the connecting section 35, and an inner hole of the connecting section 35 may be connected to the admission hole 36 of the first portion 3a of the member 3 from a lower direction. In this manner, an upper end of the sub-piston rod 22 can be sequentially moved in the inner hole of the connecting section 35 and the admission hole 36 by the contraction operation B of the damper 1.

The fixing rod guide 14 and the movable rod guide 18 are in the shape of a short cylinder respectively. The fixing rod guide 14 and the movable rod guide 18 are provided with a guide main body 37 in which the bushings 13 and 17 are pressed, a seal body 38 provided with an O-ring attached on the outer circumference of each guide main body 37 and sealing a space between the inner circumference of the cylinder tube 10 and the outer circumference of the guide main body 37, and a seal body 39 provided with an oil seal attached to an inner circumference of the guide main body 37 in a vicinity of each of the bushings 13 and 17 in the axial direction of the cylinder tube 10 and sealing a space between an outer circumference of the main piston rods 21 and the sub-piston rod 22 and the inner circumference of the guide main body 37 on the axial center 9, respectively.

Both of the main piston rod 21 and the sub-piston rod 22 are positioned on the axial center 9 and have generally the same diameter. In addition, axial center holes 40 are provided on the axial center 9 of the main piston rod 21 and the sub-piston rod 22 respectively. The axial center holes 40 pass through the main piston rod 21 and the sub-piston rod 22 in the axial direction, respectively, and are connected to each other. A defining body 40a in the shape of a cylinder is fitted in a middle section in the axial direction of the axial center holes 40 which are defined by the side of the first end 16 and the side of the second end 11 of the cylinder tube 10.

In the axial direction of the cylinder tube 10, a first oil chamber 42 filled with oil 41 is defined between the fixing rod guide 14 and the piston 20, and a second oil chamber 43 filled with the oil 41 is defined between the movable rod guide 18 and the piston 20. The oil 41 in the first and the second oil chambers 42 and 43 is normally pressurized to a pressure as high as about 2 MPa by the spring 24 via the movable rod guide 18.

The damper 1 is provided with an expansion side damping force generator 46 which generates a damping force by allowing the oil 41 to flow from the first oil chamber 42 to the second oil chamber 43 when the damper 1 performs the expansion operation A, and a contraction side damping force generator 47 which generates a damping force by allowing the oil 41 to flow from the second oil chamber 43 to the first oil chamber 42 when the damper 1 performs the contraction operation B.

The expansion side damping force generator 46 is provided with an expansion side main oil passage 48 passing through the piston 20 in the axial direction of the cylinder tube 10; an expansion side main damping valve 49 as a leaf valve for opening and closing the expansion side main oil passage 48 from the second oil chamber 43 side; an expansion side sub-oil passage 50 formed across the piston 20, the main piston rod 21, and the defining body 40a and connecting the first oil chamber 42 to the second oil chamber 43; and an expansion side sub-damping valve 51 as a leaf valve for opening and closing the expansion side sub-oil passage 50 from the second oil chamber 43 side.

Further, the expansion side damping force generator 46 is provided with a regulating valve 52 preferably of a needle valve type fitted in the axial center holes 40 and making it possible to adjust an opening of the expansion side sub-oil passage 50, an operating section 54 screwed to an upper end of the axial center holes 40 around the axial center 9 by a tool 53, and an operation rod 55 axially movably in the axial center holes 40. One end (a lower end) of the operation rod 55 is connected to the regulating valve 52, while the other end (an upper end) is normally biased by pressure of the oil 41 caused by the spring 24 and pressurized to be in contact with a lower end surface of the operating section 54.

An operation hole 67 which makes it possible to operate the operating section 54 from an outside area above the first end 16 of the cylinder tube 10 is provided in the first end 16 of the cylinder tube 10. Specifically, the operation hole 67 is provided with the inner hole of the connecting section 35. In addition, the inner hole of the connecting section 35 is opened in the axial direction of the cylinder tube 10 toward an outside of the first end 16 of the cylinder tube 10.

The contraction side damping force generator 47 is provided with a contraction side main oil passage 58 passing through the piston 20 in the axial direction of the cylinder tube 10; a contraction side main damping valve 59 as a leaf valve for opening and closing the contraction side main oil passage 58 from the first oil chamber 42 side; a contraction side sub-oil passage 60 formed across the piston 20, the main piston rod 21, and the defining body 40a and connecting the second oil chamber 43 to the first oil chamber 42; and a contraction side sub-damping valve 61 as a leaf valve for opening and closing the contraction side sub-oil passage 60 from the side of the first oil chamber side 42.

In addition, the contraction side damping force generator 47 is provided with a regulating valve 62 preferably of a needle valve type fitted in the axial center holes 40 and making it possible to adjust an opening of the contraction side sub-oil passage 60, an operating section 64 screwed on a lower end of the axial center holes 40 around the axial center 9 by a tool 63, and an operation rod 65 axially movably fitted in the axial center holes 40. One end (an upper end) of the operation rod 65 is connected to the regulating valve 62, while the other end (a lower end) is normally biased by pressure of the oil 41 caused by the spring 24 and pressurized to be in contact with an upper end surface of the operating section 64.

An operation of the operating section 54 of the expansion side damping force generator 46 is possible from an outside area above the cylinder tube 10. Accordingly, when the operating section 54 is operated, the operation rod 55 and the regulating valve 52 are synchronized with the operating section 54. This makes it possible to adjust the opening of the expansion side sub-oil passage 50. In other words, this makes it possible to adjust the damping force on the expansion side.

On the other hand, an operation of the operating section 64 of the contraction side damping force generator 47 is possible from an outside area below the second end 11 of the cylinder tube 10. Accordingly, when the operating section 64 is operated, the operation rod 65 and the regulating valve 62 are synchronized with the operating section 64. This makes it possible to adjust the opening of the contraction side sub-oil passage 60. In other words, this makes it possible to adjust the damping force on the contraction side.

When the vehicle 2 runs on a flat road with an ordinary load, the weight on the vehicle 2 side and biasing force of the suspension spring 29 are balanced so that the piston 20 is positioned generally at the center between the fixing rod guide 14 and the movable rod guide 18 in the axial direction of the cylinder tube 10 (indicated by an alternate long and short dash line in FIG. 1).

While the vehicle 2 is running, external forces such as impact forces supplied to the damper 1 and the biasing force of the suspension spring 29 are transmitted to each other, and, therefore, the damper 1 can perform the expansion operation A. In this case, if the speed of the expansion operation A of the damper 1 is slow, the oil 41 in the first oil chamber 42 passes through the expansion side sub-oil passage 50 and flows toward the second oil chamber 43. On this occasion, the oil 41 flows (arrow C) through a "throttle oil passage" in the expansion side sub-oil passage 50 whose opening is adjusted by the regulating valve 52 and an "open valve oil passage" of the expansion side sub-damping valve 51 pushed open by hydraulic pressure in the expansion side sub-oil passage 50 surpassing the bias of the expansion side sub-damping valve 51. As a result, the damping force is generated.

The throttle oil passage and the open valve oil passage are oil passages which generate damping forces and are herein after referred to as the damping force generation oil passage including such passages described below. A simple throttle oil passage whose opening is not adjustable is also included in the damping force generation oil passage. In addition, the damping force generation oil passage may be provided in a wall of the cylinder tube 10 or outside the cylinder tube 10.

On the other hand, if the speed of the expansion operation A of the damper 1 becomes high, the oil 41 in the first oil chamber 42 also passes through the expansion side main oil passage 48 and flows toward the second oil chamber 43. On this occasion, the oil 41 flows (arrow D) through the open valve oil passage of the expansion side main damping valve 49 pushed open by hydraulic pressure in the expansion side main oil passage 48 surpassing the biasing force of the expansion side main damping valve 49. As a result, another damping force is generated as well as the damping force described above.

On the other hand, when the damper 1 performs the contraction operation B, if the speed of the contraction operation B of the damper 1 is slow, the oil 41 in the second oil chamber 43 passes, firstly, through the contraction side sub-oil passage 60 and flows toward the first oil chamber 42. On this occasion, the oil 41 flows (arrow E) through the throttle oil passage in the contraction side sub-oil passage 60 whose opening is adjusted by the regulating valve 62 and the open valve oil passage of the contraction side sub-damping valve 61 pushed open by hydraulic pressure in the contraction side sub-oil passage 60 surpassing the bias of the contraction side sub-damping valve 61. As a result, the damping force is generated.

On the other hand, if the speed of the contraction operation B of the damper 1 becomes high, the oil 41 in the second oil chamber 43 also passes through the contraction side main oil passage 58 and flows toward the first oil chamber 42. On this occasion, the oil 41 flows (arrow F) through the open valve oil passage in the contraction side main damping valve 59 pushed open by hydraulic pressure in the contraction side main oil passage 58 surpassing the bias of the contraction side main damping valve 59. As a result, another damping force is generated as well as the damping force described above.

In this manner, the external force is damped by each damping force described above. Consequently, vibrations starting to occur between the first portion 3a and the second portion 3b of the member 3 are suppressed and become small.

As described above, when the damper 1 performs the contraction operation B, the oil 41 in the second oil chamber 43 is pressurized by the piston 20. Therefore, the oil 41 flows through the contraction side main oil passage 58 and the contraction side sub-oil passage 60 (arrows E and F), and each damping force described above is generated. In this case, if the spring constant of the spring 24 is too small (weak), when the damper 1 performs the contraction operation B, the spring 24 is easily contracted as a result of elastic deformation. Consequently, the oil 41 in the second oil chamber 43 is insufficiently pressurized by the piston 20. Accordingly, the amount and speed of the oil 41 flowing in the contraction side main oil passage 58 and the contraction side sub-oil passage 60 become insufficient. As a result, the desired damping force is not obtained.

From this viewpoint, the spring constant of the spring 24 is made larger (stronger) than a predetermined value for the damping force to be equal to or greater than a desired lowest value.

In addition, when the damper 1 performs the expansion or the contraction operation A or B, the entire trajectory of the sub-piston rod 22 is contained in an internal space of the cylinder tube 10. Further in addition, at least a portion of the trajectory of the sub-piston rod 22 is contained in an internal space of the spring 24.

According to the construction described above, the oil 41 is normally biased by the spring 24 via the movable rod guide 18. Accordingly, when the damper 1 performs the operation A or B, it is prevented that cavitation is caused by a decrease of pressure in the first and the second oil chambers 42 and 43. Consequently, an excellent damping force characteristic of the damper 1 is maintained. On the other hand, even if the volume of the oil 41 changes as a result of a temperature change of the oil 41, a predetermined pressurization state is maintained in the oil 41 by the biasing force of the spring 24. As a result, the excellent damping force characteristic of the damper 1 is further maintained.

In the damper 1, the side of the first end 16 of the cylinder tube 10 is used as a housing for containing the spring 24. On the other hand, the movable rod guide 18 is used to close the side of the first end 16 of the cylinder tube 10 and also used to transmit the biasing force of the spring 24 to the oil 41 or, in other words, also used as a free piston as referred to in the conventional art. Consequently, the number of parts in the damper 1 is decreased, and thereby the construction of the damper is simplified.

Moreover, as described above, the spring 24 is disposed coaxially with the axial center 9 of the cylinder tube 10.

Therefore, it is possible to make the damper 1 more compact than the damper of the conventional art in which the gas reservoir for pressurizing the oil is disposed outward in the radial direction to be parallel to the cylinder tube. Accordingly, the degree of freedom in installation of the damper 1 can be improved.

In addition, as described above, the connecting section 35 which connects the first end 16 of the cylinder tube 10 to the first portion 3a of the member 3 is provided on the first end 16, and the end of the sub-piston rod 22 opposite to the piston 20 can move in the connecting section 35.

Therefore, an internal space of the connecting section 35 is used as a space for containing the trajectory of the sub-piston rod 22 when the damper 1 performs the contraction operation B.

As a result, firstly, it is possible to make the damper 1 more compact than that in a case that the cylinder tube 10 containing the trajectory of the sub-piston rod 22 and the connecting section 35 are simply in parallel in the axial direction of the damper 1. Thus, the degree of freedom in installation thereof is improved. Secondly, for example, even when the damper 1 is mounted on the vehicle 2 which has a narrow extra space, the stroke of the piston 20 of the damper 1 can be made as long as possible because the damper 1 is compact. Thus, it is possible to use on very rough roads.

In addition, as described above, the inside of the connecting section 35 is opened in the axial direction of the cylinder tube 10 toward the outside of the first end 16 of the cylinder tube 10.

Therefore, in addition to the internal space of the connecting section 35 described above, the space outside the end of the connecting section 35 in the axial direction of the cylinder tube 10 is used as a space for movement of the sub-piston rod 22 when the damper 1 performs the contraction operation B. Consequently, the stroke of the damper 1 can be made even longer.

Further, as described above, the admission hole 36, in which the end on the side opposite to the piston 20 of the sub-piston rod 22 can move, is provided in the first portion 3a of the member 3.

Accordingly, the space in the admission hole 36 is used as a space for containing the trajectory of the sub-piston rod 22 when the damper 1 performs the contraction operation B.

Consequently, firstly, it is possible to make the assembly of the damper 1 and the first portion 3a of the member 3 more compact than that in a case in which the cylinder tube 10 containing the trajectory of the sub-piston rod 22 and the first portion 3a of the member 3 are simply in parallel in the axial direction of the damper 1. As a result, the degree of freedom in installation of the assembly thereof is improved. Secondly, for example, even when the damper 1 is disposed on the vehicle 2 which has a narrow extra space, the stroke of the piston 20 of the damper 1 can be made as long as possible because the assembly described above can be made compact. As a result, it is possible to travel on very rough roads.

Further, as described above, the regulating valve 62 which makes it possible to adjust an opening of the damping force generation oil passage provided on the axial center 9 of the sub-piston rod 22 and the operation rod 65 fitted in the axial center holes 40 provided on the axial center 9 of the sub-piston rod 22, having one end connected to the regulating valve 62, and having the other end as the operating section 64 are provided. In addition, the operation hole 67, which makes it possible to operate the operating section 64 from an outer area of the first end 16 of the cylinder tube 10, is provided on the first end 16.

Consequently, when the regulating valve 62 is adjusted, an operation of the operating section 64 is not obstructed by the connecting section 35 and can be easily performed from the outer area of the first end 16 of the cylinder tube 10. As a result, the degree of freedom in relation to an operation of the damper 1 performed for obtaining a desired damping force characteristic is improved.

Further, as described above, when the damper 1 performs the expansion or the contraction operation A or B, the trajectory of the sub-piston rod 22 is contained in the internal space of the cylinder tube 10.

Therefore, when the damper 1 provided on the member 3 performs the operation A or B, it is prevented, by the cylinder tube 10 containing the trajectory of the sub-piston rod 22, that the sub-piston rod 22 of the damper 1 interferes with either portion of the member 3, for example, by coming in contact with either portion of the member 3. Consequently, mounting the damper 1 on the member 3 becomes easy because it is not necessary to consider the trajectory of the sub-piston rod 22.

Further, as described above, the spring 24 is a coil spring, and when the damper 1 performs the expansion or the contraction operation A or B, the trajectory of the sub-piston rod 22 is contained in the internal space of the spring 24.

Therefore, it is possible to make the damper 1 as compact as possible because the internal space of the spring 24 is used for the trajectory of the sub-piston rod 22. Consequently, the degree of freedom in installation of the damper 1 can be improved.

Figure 5:
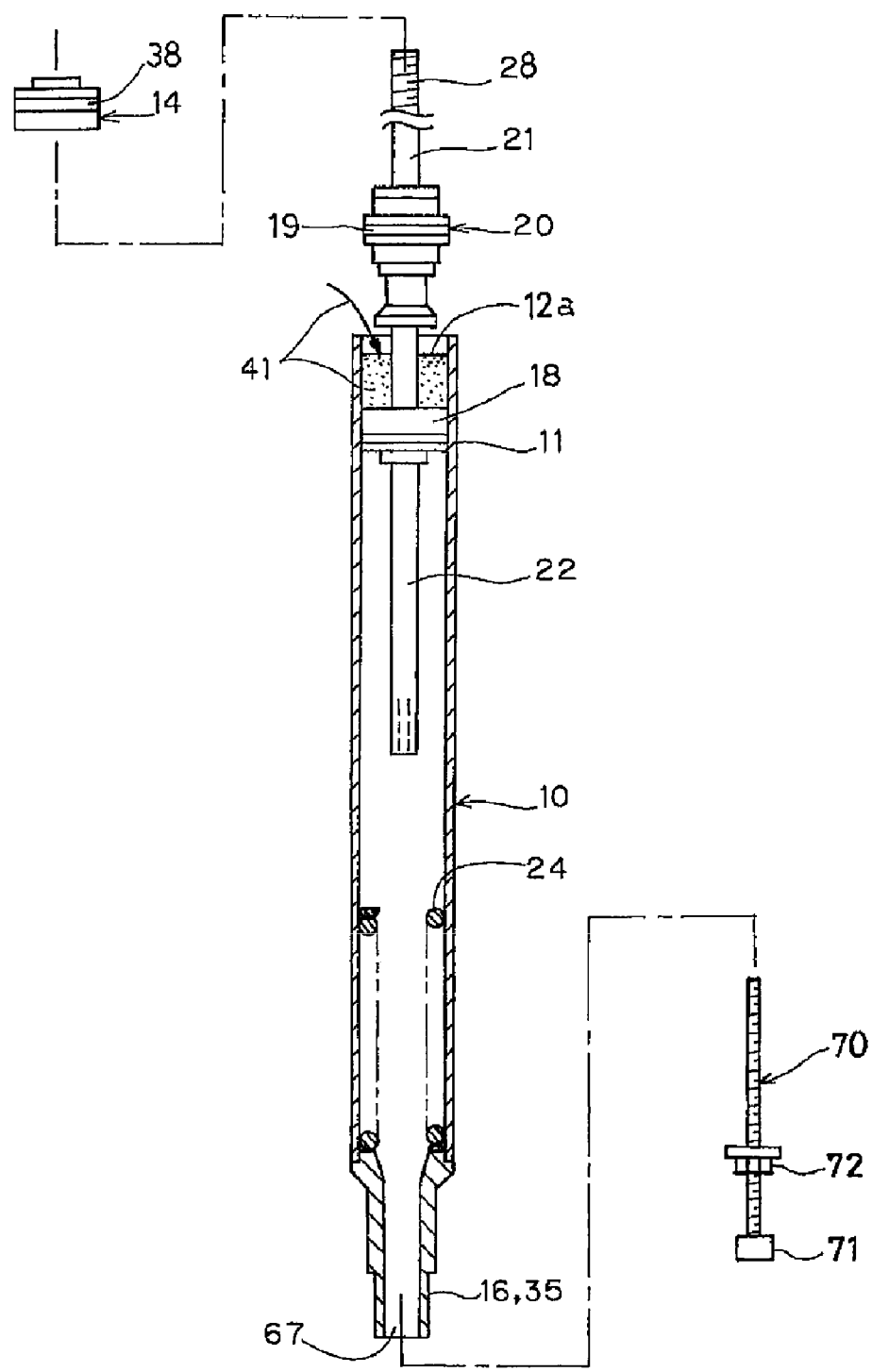
FIG. 5 illustrates an early stage of an assembling method of the damper, according to the first preferred embodiment of the present invention.
Figure 6:
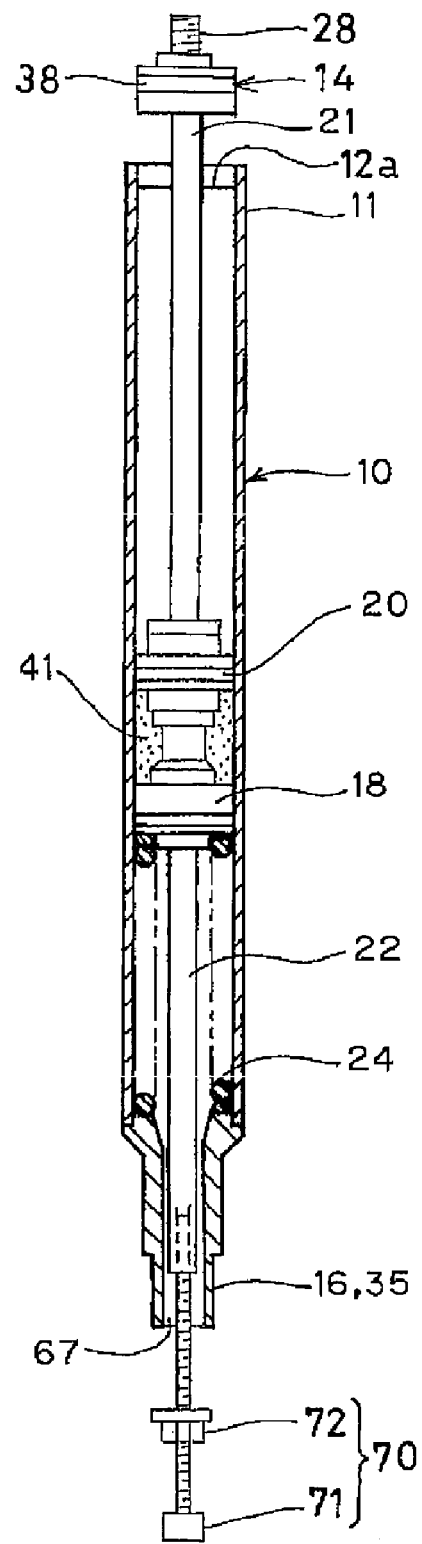
FIG. 6 illustrates a middle stage of the assembling method of the damper, according to the first preferred embodiment of the present invention.
Figure 7:
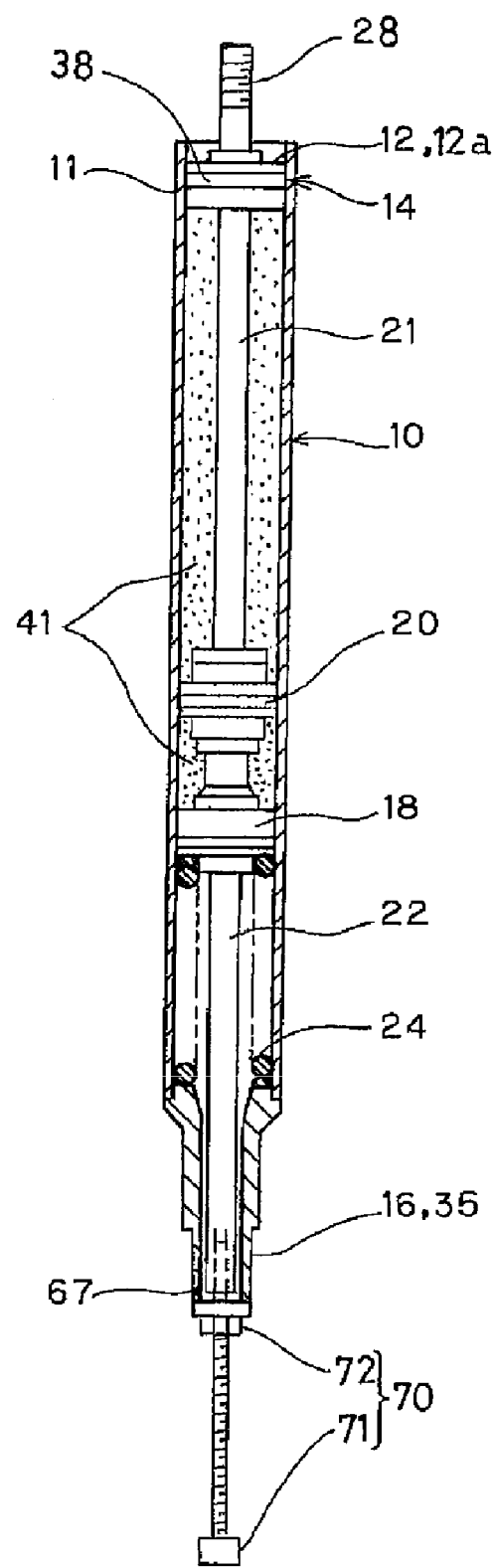
FIG. 7 illustrates an advanced stage of the assembling method of the damper, according to the first preferred embodiment of the present invention.

FIGS. 5 to 7 illustrate how the damper 1 is assembled.

As shown in FIG. 5, when the damper 1 is assembled, firstly, the cylinder tube 10 is vertically positioned so that the other end 11 of the cylinder tube 10 is in a position of the upper end. Here, the spring 24 is fitted in the cylinder tube 10. On the other hand, the piston 20, the main piston rod 21, and the sub-piston rod 22 are assembled beforehand as one assembly. After this, the movable rod guide 18 is passed through the sub-piston rod 22 in the assembly, and the movable rod guide 18 is made to come in contact with a piston section. The piston section as referred to here is a generic name meaning the piston 20, the damping valves 49, 51, 59, and 61, and fasteners fixing the piston 20 and the damping valves 49, 51, 59, and 61 on the piston 20 or each of the piston rods 21 and 22.

Following this, the assembly is fitted in the upper end of the cylinder tube 10 from the sub-piston rod 22 side. Further, the movable rod guide 18 is fitted in the cylinder tube 10 and pushed into a position at which a lower edge of the piston ring 19 of the piston 20 closes an upper edge of the cylinder tube 10.

After this, as shown FIG. 5, the assembly is slightly lifted with the movable rod guide 18 left in the cylinder tube 10, and a first amount of the oil 41 is injected in the upper end of the cylinder tube 10. Following this, the assembly is pushed in the cylinder tube 10 until the piston section comes in contact with the movable rod guide 18. Consequently, as the piston section is soaked in the oil 41 in the upper end of the cylinder tube 10, the oil surface is raised. The oil surface reaches the lower surface of the piston 20 when the lower edge of the piston ring 19 closes the upper edge of the cylinder tube 10.

As shown in FIG. 6, the spring 24 in the cylinder tube 10 is at its freely extending length. The assembly is fitted in the cylinder tube 10 until the lower surface of the movable rod guide 18 comes in contact with the upper end of the spring 24. Following this, the sub-piston rod 22 is pulled downward with a pulling tool 70 through the operation hole 67 as the inner hole of the connecting section 35. The pulling tool 70 is a screw jack and is provided with a bolt 71 and a nut 72 screwed on the bolt 71. When the sub-piston rod 22 is pulled downward with the jack bolt 70 as described above, firstly, an end of the screw bolt 71 is screwed in the internal thread for the operating section 54 formed in the sub-piston rod 22.

Following this, the nut 72 is turned in the state shown in FIG. 6 until the nut 72 comes in contact with the lower surface of the connecting section 35. The nut 72 is further turned to pull out the bolt 71 from the connecting section 35 as much as a first predetermined distance. In this manner, the spring 24 is contracted in a state that the spring 24 is longer than an initial freely extending length by the predetermined distance. Following this, a second amount of the oil 41 is injected in the cylinder tube 10. The total of the first and the second amount of the oil 41 is the entire amount of the oil 41 when the damper 1 is assembled.

Following this, the fixing rod guide 14 is fitted in the upper end of the cylinder tube 10, and the bottom surface thereof is made to come in close contact with the oil surface. At this time, the seal body 38 of the fixing rod guide 14 comes to a position at which the seal body 38 closes the upper edge of the cylinder tube 10. Following this, the nut 72 on the pulling tool 70 is turned, and the bolt 71 is further pulled out by a second predetermined distance.

Consequently, as shown in FIG. 7, as the spring 24 is contracted to the initial length, the incompressible oil 41 and the fixing rod guide 14 are lowered in a similar manner. Consequently, an annular groove for the circlip 12 provided on the inner circumference of the upper end of the cylinder tube 10 is exposed above the upper edge of the fixing rod guide 14 lowered as described above. The circlip 12 is fitted with the annular groove here. Following this, the bolt 71 is loosened and taken out of the sub-piston rod 22. Consequently, the oil 41 in the cylinder tube 10 is pressurized by the spring 24 via the movable rod guide 18. Following this, the outer tube 26 is connected to the main piston rod 21 by the fastener 28. In this manner, assembling the damper 1 is completed.

In the assembling method of the damper 1, the damper 1 may be assembled without using the pulling tool 70 as described below. A spring whose free length is shorter than that in the method above is used as the spring 24. In the state shown in FIG. 6, after the second amount of the oil 41 is put in the cylinder tube 10, the fixing rod guide 14 is fitted in the upper end of the cylinder tube 10 to achieve a state similar to that in the method described above. Following this, the fixing rod guide 14 is fitted in the upper end of the cylinder tube 10 to come to a predetermined position by a press not shown. Following this, the fixing rod guide 14 is fixed by the circlip 12 in relation to the predetermined position of the cylinder tube 10. In this manner, assembling the damper 1 is completed.

Since the oil 41 is incompressible, the spring 24 pushed and moved by the fixing rod guide 14 via the oil 41 and the movable rod guide 18 is automatically set to an initial length.

The description above is based on the example shown in the drawings. However, the piston 20 may be connected to the sub-piston rod 22, and the main piston rod 21 may be connected to the sub-piston rod 22. Further, the main piston rod 21 and the sub-piston rod 22 may form an integral rod.

Further, the fastener 23 may be used only for fixing the piston 20 on the piston rod, and the main piston rod 21 and the sub-piston rod 22 may be connected to each other as described below. An external thread is formed on the end of the main piston rod 21 while an internal thread is formed in the end of the sub-piston rod 22. Thus, these ends are directly screwed to each other.

On the other hand, the spring 24 may be defined by a large number of belleville springs accumulated in the axial direction of the cylinder tube 10. In this case, adjacent belleville springs are so disposed that tops thereof or bottoms thereof are in contact with each other. When the spring 24 is defined by belleville springs as described above, it is possible to make the spring 24 compact in the axial direction. Accordingly, it is possible to make the damper 1 compact.

Figure 2:
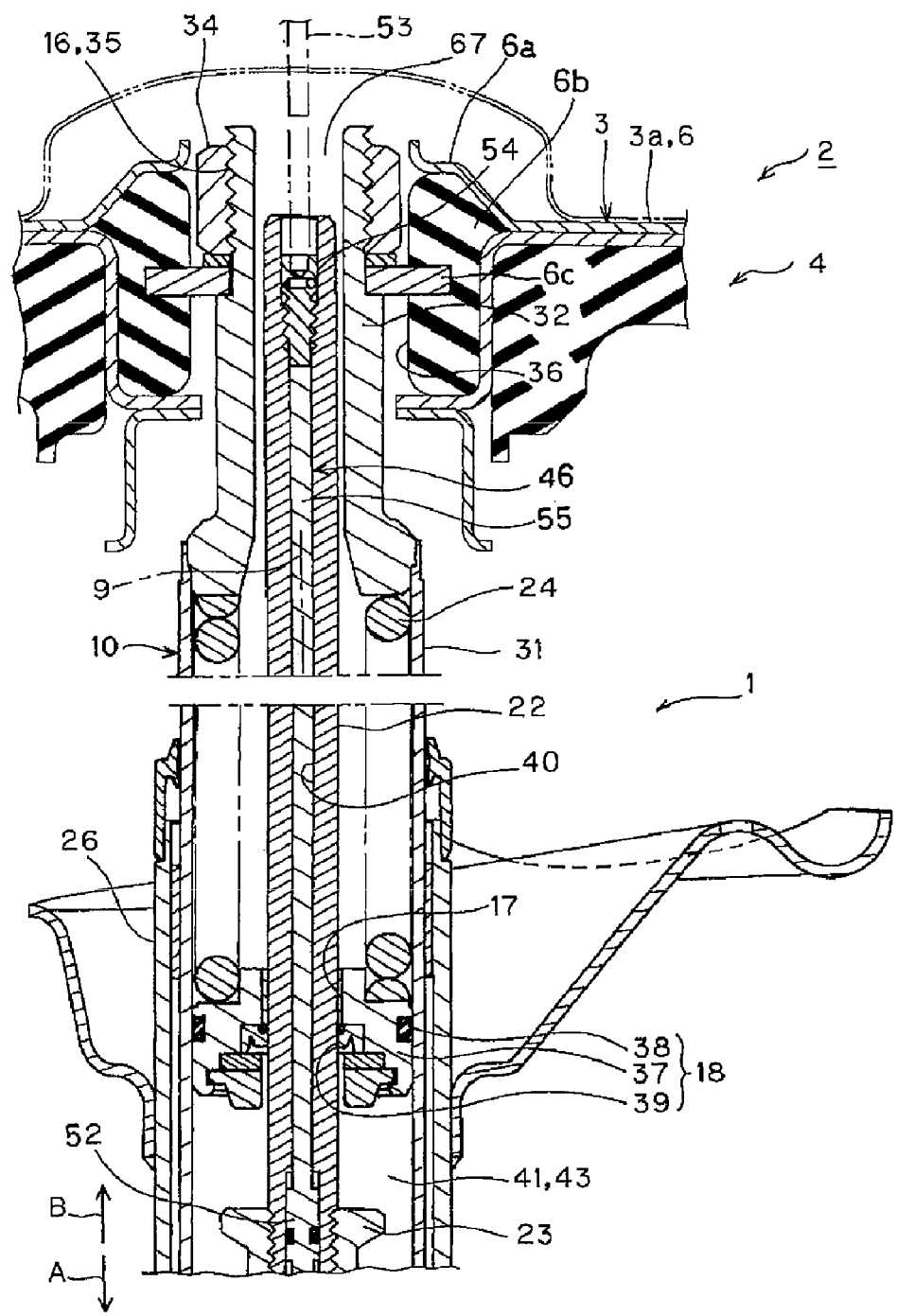
FIG. 2 is an enlarged cross-sectional view of an upper portion of FIG. 1, according to the first preferred embodiment of the present invention.
Figure 3:
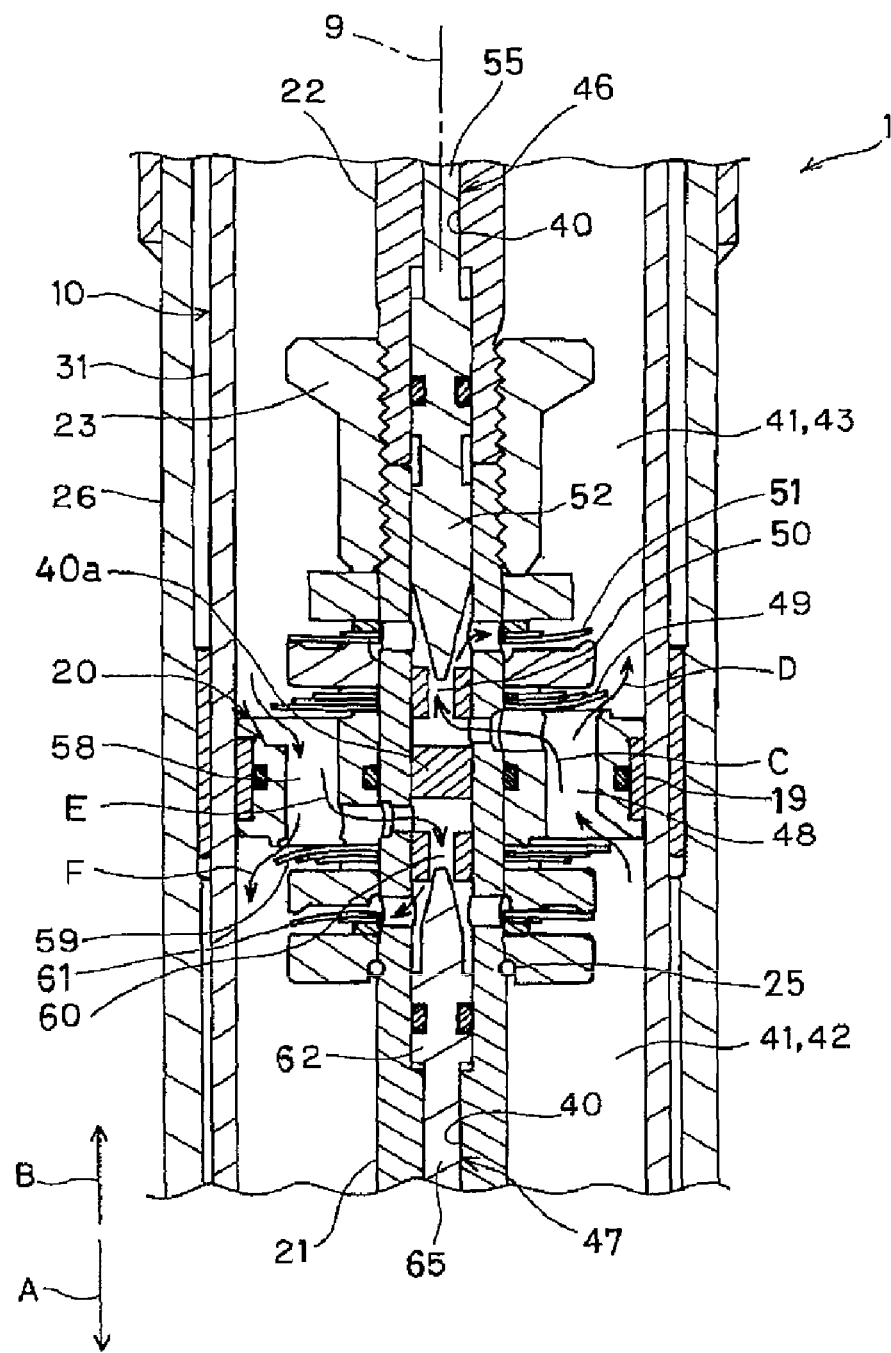
FIG. 3 is an enlarged cross-sectional view of a middle portion in the longitudinal direction of FIG. 1, according to the first preferred embodiment of the present invention.
Figure 4:
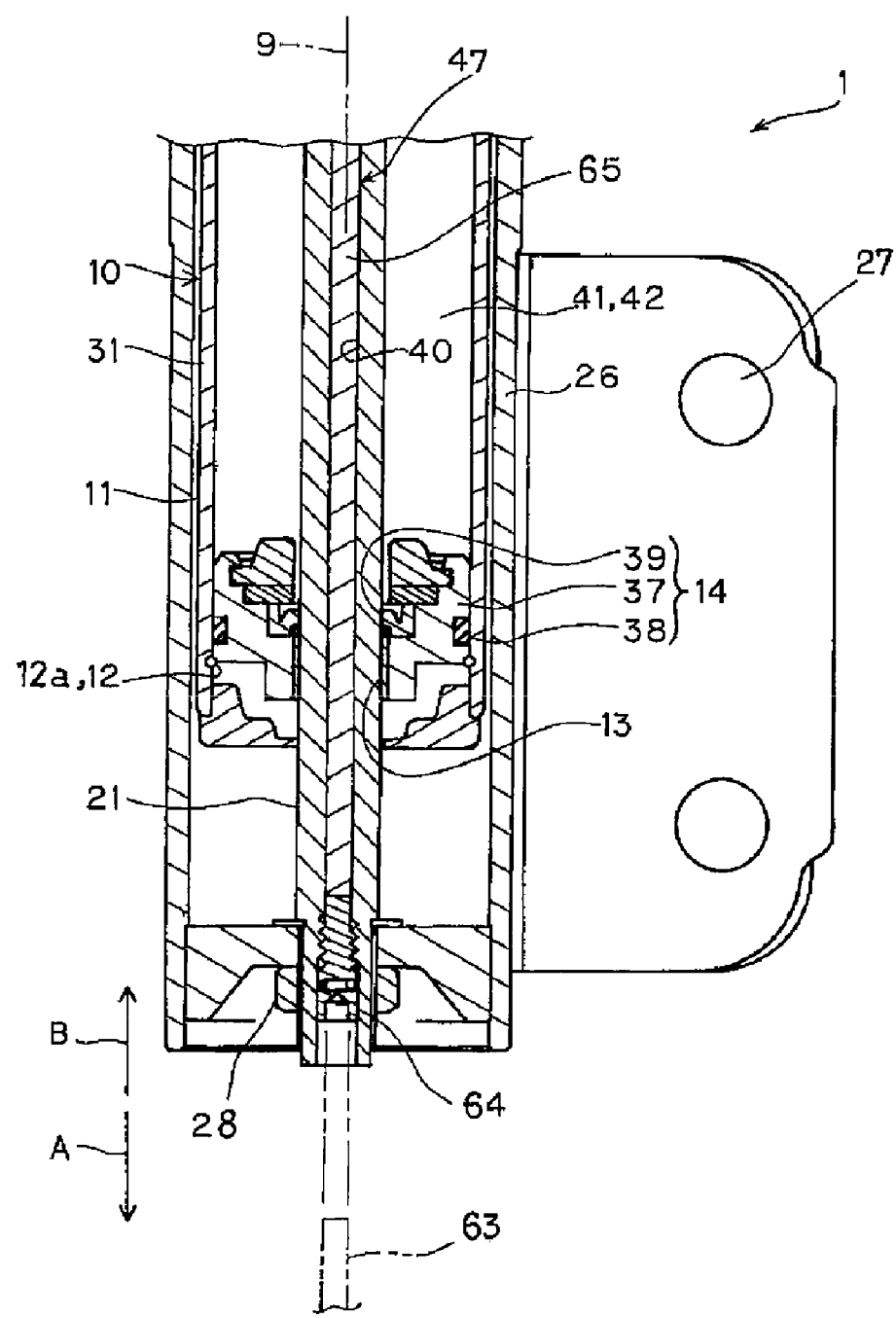
FIG. 4 is an enlarged cross-sectional view of a lower portion of FIG. 1, according to the first preferred embodiment of the present invention.

On the other hand, as shown in FIG. 2 of JP-A-Hei11-1655211, the connecting section 35 may be a pivotal section having a pivotal hole supported by a pivotal shaft in relation to the first portion 3a of the member 3 and may not have the operation hole 67. Further, the outer tube 26 may not be provided.

Further, the seal body 38 of the movable rod guide 18 may be an oil seal having a slide resistance smaller than that of an O-ring. Further, each seal body 39 may be an O-ring.

On the other hand, the damper 1 may be positioned upside down or may be positioned horizontally or obliquely. Further, the damper 1 may be a steering damper which is provided across a body frame and a front fork of a motorcycle and damps vibrations starting to occur between the body frame and the front fork. As described above, the damper 1 is used for a vehicle. However, the damper 1 can be widely used in industrial machinery or the like.

FIGS. 8 to 13 illustrate second to seventh preferred embodiments. Those preferred embodiments have many features in common with the first preferred embodiment with respect to the construction and operation thereof. From this viewpoint, common reference numerals will be provided in the drawings and common descriptions will be repeated, and different points will be mainly described. Further, the construction of each feature in these preferred embodiments may be variously combined in accordance with the benefits and advantages of the preferred embodiments of the present invention.

Second Preferred Embodiment

A second preferred embodiment of the present invention will be described herein after in further detail with reference to FIG. 8.

Figure 8:
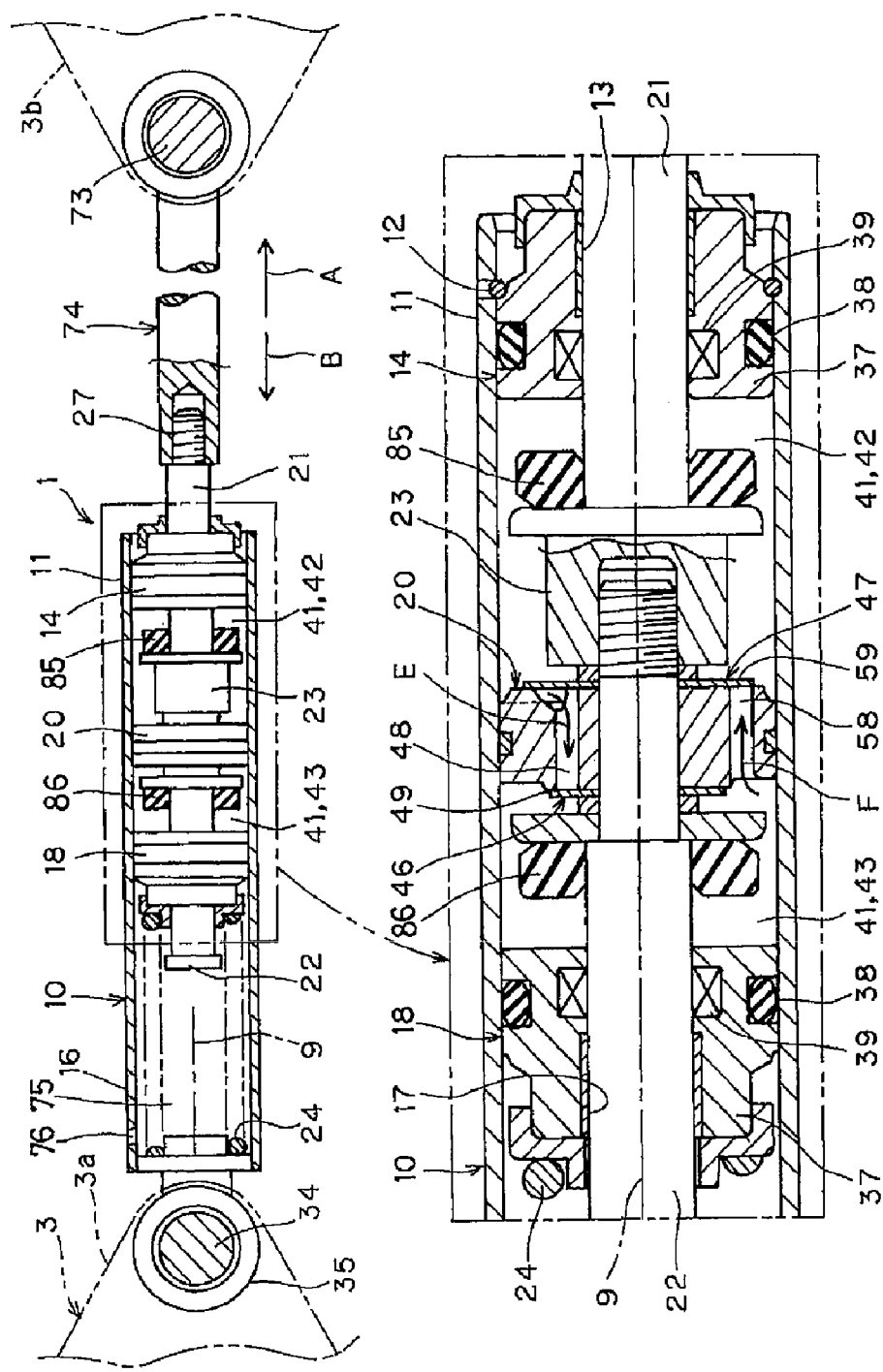
FIG. 8 is similar to FIGS. 1 to 4, according to a second preferred embodiment of the present invention.

As shown in FIG. 8, the damper 1 in the second preferred embodiment is arranged across the first portion 3a and the second portion 3b of the member 3 as a vehicle body of an automobile, for example, and damps micro-vibrations (a stroke of about 1 mm or less, for example) starting to occur between the first portion 3a and the second portion 3b.

In this preferred embodiment, the first portion 3a and the second portion 3b are, for example, parts of the vehicle body in a vicinity of the left and the right suspension systems of the automobile, an inside of the engine room in the vehicle body, walls horizontally opposed to each other in a rear trunk room (suspension tower), or the like.

The connecting section 35 is attached to the one end 16 of the cylinder tube 10. The cylinder tube 10 is connected to the first portion 3a of the member 3 by the connecting section 35 and the fastener 34. The first end 16 of the cylinder tube 10 is closed by a base section of the connecting section 35. The spring 24 is contained in a space 75 enclosed by the movable rod guide 18 and the base section of the connecting section 35 in the cylinder tube 10. A vent hole 76 connecting the space 75 to atmospheric air is provided on the first end 16 of the cylinder tube 10.

On the other hand, an extension rod 74 is disposed on the axial center 9. One end of the extension rod 74 is connected to an extended end of the main piston rod 21 by the fastener 27. The other end of the extension rod 74 is connected to the second portion 3b of the member 3 by a fastener 73. Pivoting tools may be used instead of the fasteners 34 and 73.

In addition, a bump stop 85 made of rubber is interposed between the fixing rod guide 14 and the piston 20. The bump stop 85 is externally fitted with the main piston rod 21 and supported there. Further, another bump stop 86 made of rubber is interposed between the movable rod guide 18 and the piston 20. The bump stop 86 is externally fitted with the sub-piston rod 22 and supported there.

The expansion side main damping valve 49 of the expansion side damping force generator 46 and the contraction side main damping valve 59 of the contraction side damping force generator 47 in this preferred embodiment generate a damping force even when the damper 1 slowly performs the expansion operation A or the contraction operation B.

Third Preferred Embodiment

A third preferred embodiment of the present invention will be described herein after in further detail with reference to FIG. 9.

Figure 9:
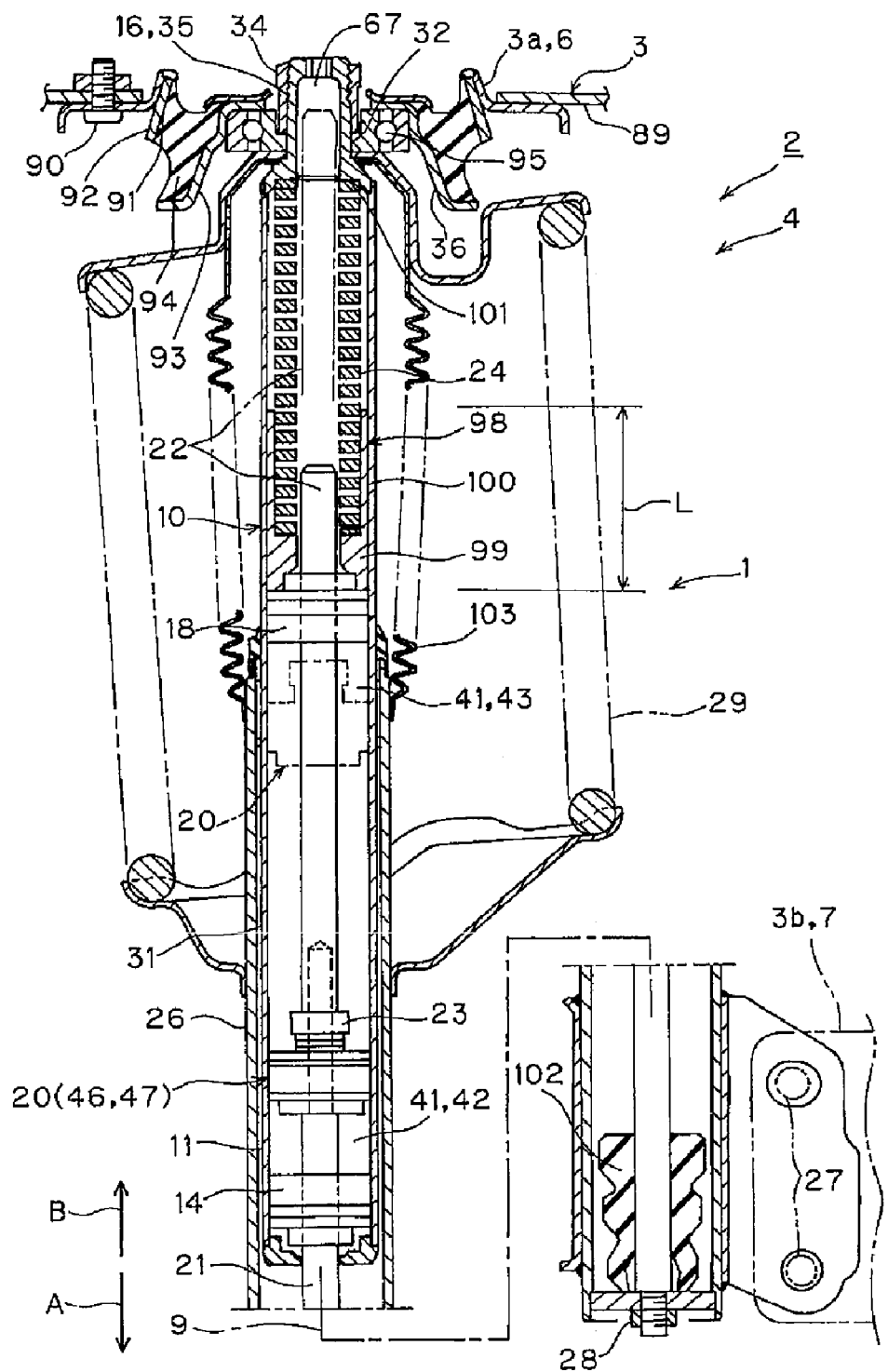
FIG. 9 is similar to FIG. 1, according to a third preferred embodiment of the present invention.

As shown in FIG. 9, the damper 1 in the third preferred embodiment is used for the suspension system 4 for a front wheel of an automobile, for example, in the same manner as illustrated in the first preferred embodiment.

The first portion 3a of the member 3 is provided with an outer bracket 92 made of sheet metal which is supported on an upper section of a suspension tower 89 in the vehicle body 6 by a fastener 90 and in which a circular opening 91 is provided, an inner bracket 93 made of sheet metal in the shape of an annulus ring disposed in the circular opening 91 generally coaxially with the circular opening, and an elastic body 94 in the shape of an annulus ring provided across the outer bracket 92 and the inner bracket 93 adhered on the outer bracket 92 and the inner bracket 93 respectively by vulcanization, for example.

The inner circumference of the inner bracket 93 is the admission hole 36 provided in the first portion 3a. The connecting section 35 of the first end 16 of the cylinder tube 10 is fitted in the admission hole 36 generally coaxially with the admission hole 36. An inner race of a bearing 95 formed with a ball bearing positioned coaxially with the axial center 9 is supported on the connecting section 35 by the fastener 34. On the other hand, an outer race of the bearing 95 is supported on the inner bracket 93. Further, the damper 1 is supported on the first portion 3a of the member 3 by the bearing 95 so that the damper 1 can be rotated (steered) around the axial center 9.

The piston 20 preferably has the same construction as that in the second preferred embodiment.

The spring 24 is a coil spring having a cross section preferably with a rectangular or substantially rectangular shape. A slider 98 having a predetermined length L in the axial direction of the cylinder tube 10 and axially and slidably fitted in the cylinder tube 10 is provided. The slider 98 is sandwiched between the movable rod guide 18 and the spring 24 by the bias of the spring 24.

Specifically, the slider 98 is provided with a base 99 in the shape of a thick-walled cylinder interposed between an end surface on the side of the spring 24 on the movable rod guide 18 and an end surface on the side of the movable rod guide 18 on the spring 24, and a cylinder 100 in the shape of a thin-walled cylinder extending integrally with the base 99 and fitted between the inner circumference of the tube main body 31 of the cylinder tube 10 and the outer circumference of the spring 24. The slider 98 is made of metal such as aluminum alloy and brass, or a plastic or resin.

The predetermined length L of the slider 98 is generally equal to or larger than the diameter thereof. The predetermined length L is, for example, about 0.7 to about 2.5 times as large as the diameter. The total of the distances in the axial direction between the base 99 and the cylinder 100 is the predetermined length L of the slider 98. In this case, the distance in the axial direction of the cylinder 100 is sufficiently larger than that of the base 99. Therefore, even if the predetermined length L of the slider 98 is made sufficiently large, it is prevented that the distance in the axial direction of the damper 1 becomes too long by the fact that the slider 98 is provided.

The end surfaces in the axial direction of the base 99 are formed to be accurately orthogonal to the axial center thereof respectively. The inner diameters of the spring 24, the connecting section 35, and the base 99 are generally the same size. On the other hand, the outer diameters of the base 99 and the cylinder 100 are the same size and are axially and slidably fitted in the tube main body 31 of the cylinder tube 10 by a clearance fit, thereby preventing rattling in the radial direction.

The cylinder 100 externally covers the lower end of the spring 24 so that the diameter of the spring 24 is permitted to slightly expand when the spring 24 causes elastic deformation in the axial direction. Accordingly, as the cylinder 100 externally covers the lower end, the lower end of the spring 24 is positioned coaxially with the axial center 9 of the cylinder tube 10. On the other hand, the upper end of the spring 24 is fitted in an aligning recess 101 provided in the small diameter tube 32, thereby preventing rattling, and positioned coaxially with the axial center 9 of the cylinder tube 10.

In this preferred embodiment, the end surface in the axial direction of the movable rod guide 18 is arranged to be accurately orthogonal to the axial center of the movable rod guide 18. On the other hand, as the spring 24 causes elastic deformation, it is difficult in general to form the end surface in the axial direction thereof to be accurately orthogonal to the axial center of the spring 24. Therefore, there tends to be an inclination on an orthogonal surface on the axial center.

Accordingly, if the end surface of the spring 24 is pressed directly against the end surface of the movable rod guide 18, the end surface of the spring 24 tends to be unevenly in contact with the end surface of the movable rod guide 18 due to the pressure. Consequently, because of such uneven contact by pressure, the movable rod guide 18, to which the bias of the spring 24 is applied, tends to slant in relation to the axial center 9 of the cylinder tube 10 and, thus, slides in the cylinder tube 10 in this state. This, however, is not preferable because smooth sliding of the movable rod guide 18 in relation to the cylinder tube 10 is prevented.

From this viewpoint, as described above, the slider 98 having the predetermined length L in the axial direction of the cylinder tube 10 and axially and slidably fitted in the cylinder tube 10 is interposed between the movable rod guide 18 and the spring 24. Consequently, even if the end surface of the spring 24 is slanted to a degree, it is prevented that the slider 98 is slanted in relation to the axial center 9 of the cylinder tube 10.

Therefore, the movable rod guide 18 in contact with the other end surface of the slider 98 is not inclined. As a result, it is prevented that both of the slider 98 and the movable rod guide 18 are inclined in relation to the axial center 9 of the cylinder tube 10. Accordingly, smooth sliding in relation to the cylinder tube 10 is secured.

In addition, a bump stop 102 opposed to the outer end of the first end 16 of the cylinder tube 10 is attached to the lower end of the outer tube 26. Further, a hood 103 of a bellows covering a portion of the cylinder tube 10 positioned outside the outer tube 26 is provided.

Fourth Preferred Embodiment

A fourth preferred embodiment of the present invention will be described herein after in further detail with reference to FIG. 10.

Figure 10:
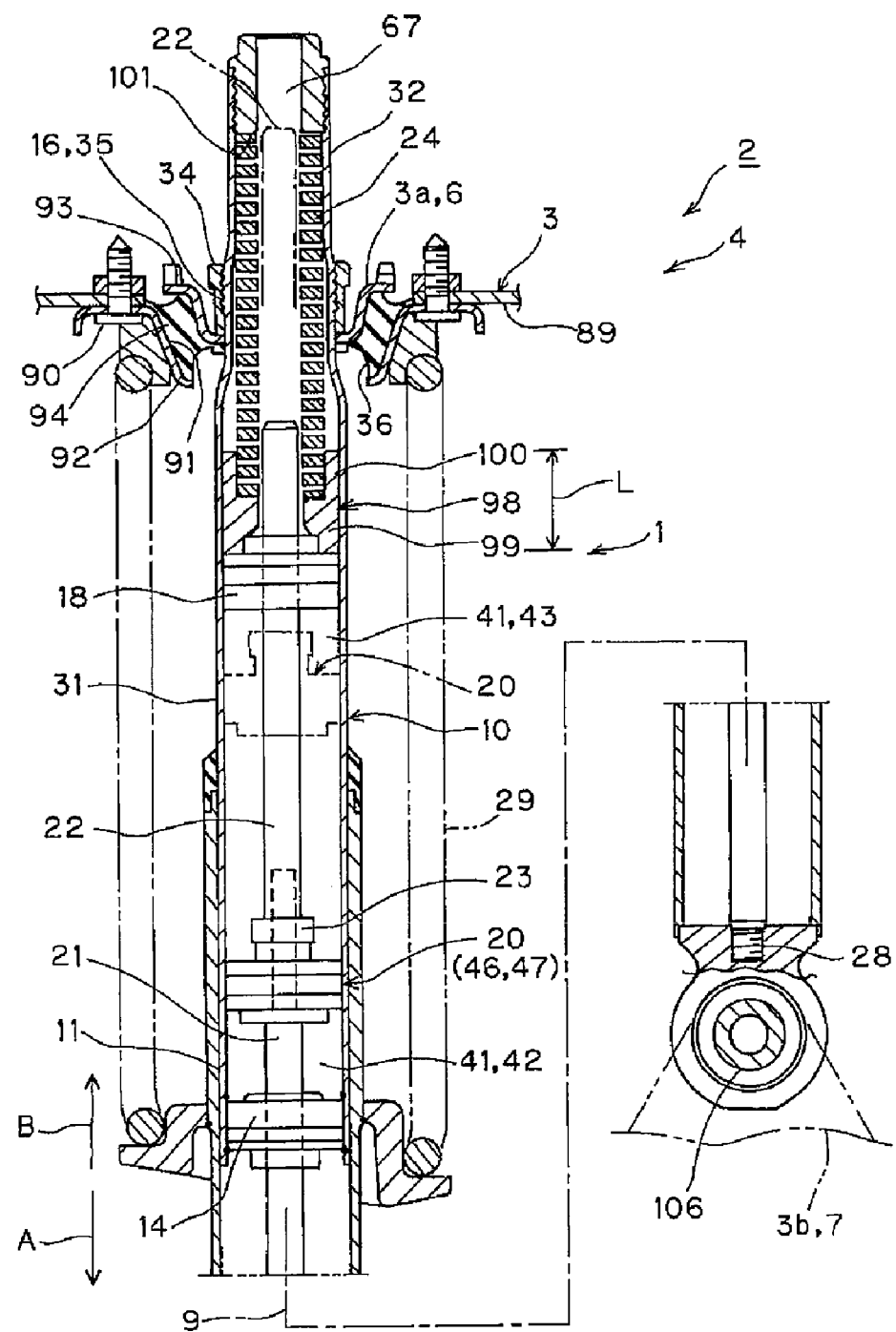
FIG. 10 is similar to FIG. 1, according to a fourth preferred embodiment of the present invention.

As shown in FIG. 10, the fourth preferred embodiment preferably has generally the same construction as the third preferred embodiment. However, the tube main body 31 and the small diameter tube 32 of the cylinder tube 10 are formed integrally with each other. The connecting section 35 is formed on an end of the small diameter tube 32 on a side closer to the tube main body 31. Therefore, the upper end of the first end 16 of the cylinder tube 10 extremely projects above the first portion 3a of the member 3. Further, the extended end of the main piston rod 21 is pivotally supported on the second portion 3b of the member 3 by a pivotal shaft 106. Further, the inner circumferences of the inner bracket 93 and the elastic body 94 in the third preferred embodiment define the admission hole 36. The bearing 95 in the third preferred embodiment is preferably not provided.

Fifth Preferred Embodiment

A fifth preferred embodiment of the present invention will be described herein after in further detail with reference to FIG. 11.

Figure 11:
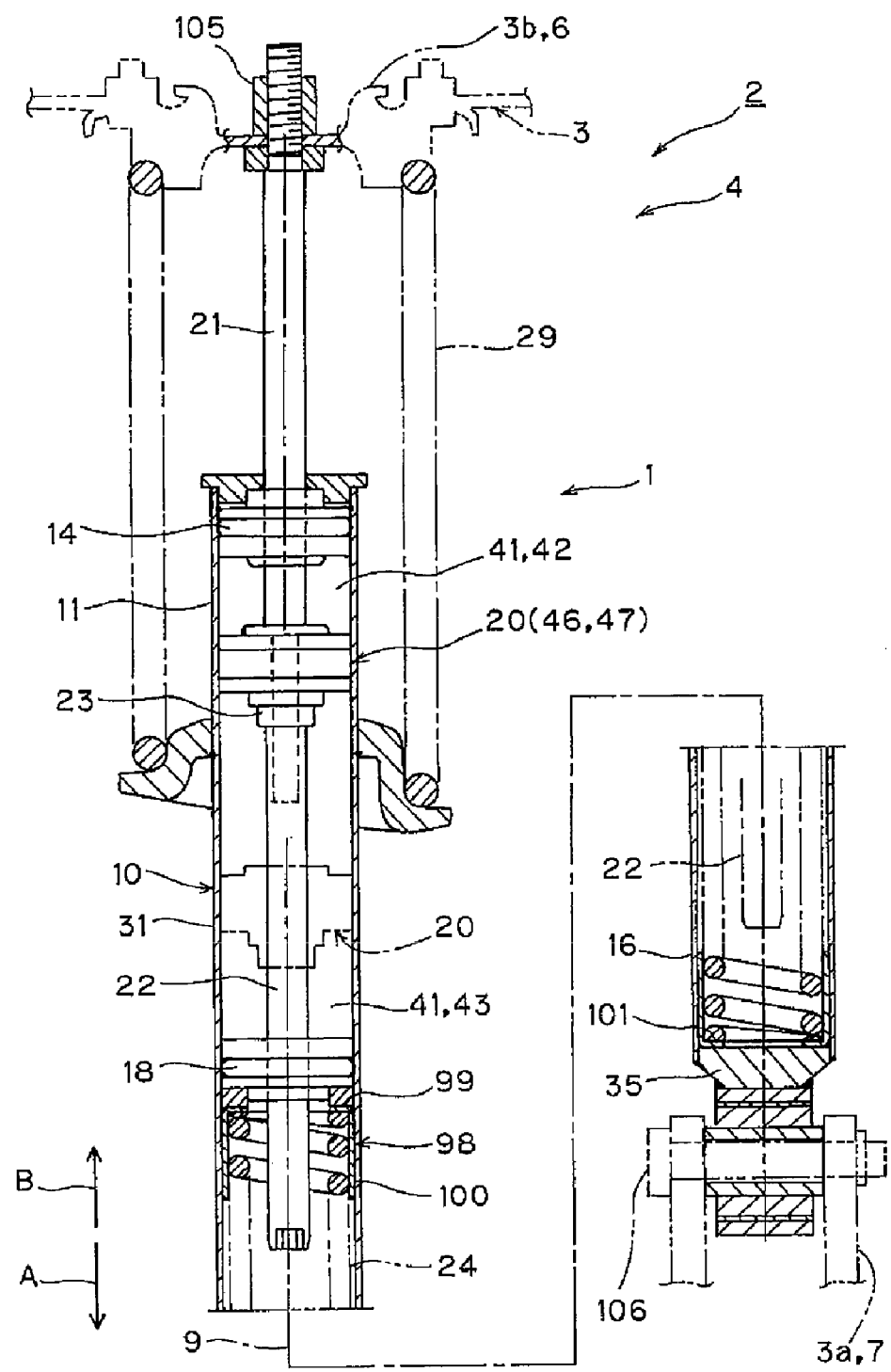
FIG. 11 is similar to FIG. 1, according to a fifth preferred embodiment of the present invention.

As shown in FIG. 11, the fifth preferred embodiment preferably has generally the same construction as the fourth preferred embodiment. However, the damper 1 and the first portion 3a and the second portion 3b of the member 3 in the fifth preferred embodiment are provided upside down as compared with those in the fourth preferred embodiment. In this case, the second portion 3b of the member 3 in the fifth preferred embodiment has the same construction as the first portion 3a of the member 3 in the fourth preferred embodiment. In addition, the extended end of the main piston rod 21 is connected to the second portion 3b of the member 3 by a fastener 105.

In the fifth preferred embodiment, the spring 24 is a coil spring having a circular or substantially circular cross section. On the other hand, the outer tube 26 is not provided. Further, the suspension spring 29 is provided across the second portion 3b of the member 3 and the cylinder tube 10.

Sixth Preferred Embodiment

A sixth preferred embodiment of the present invention will be described herein after in further detail with reference to FIG. 12.

Figure 12:
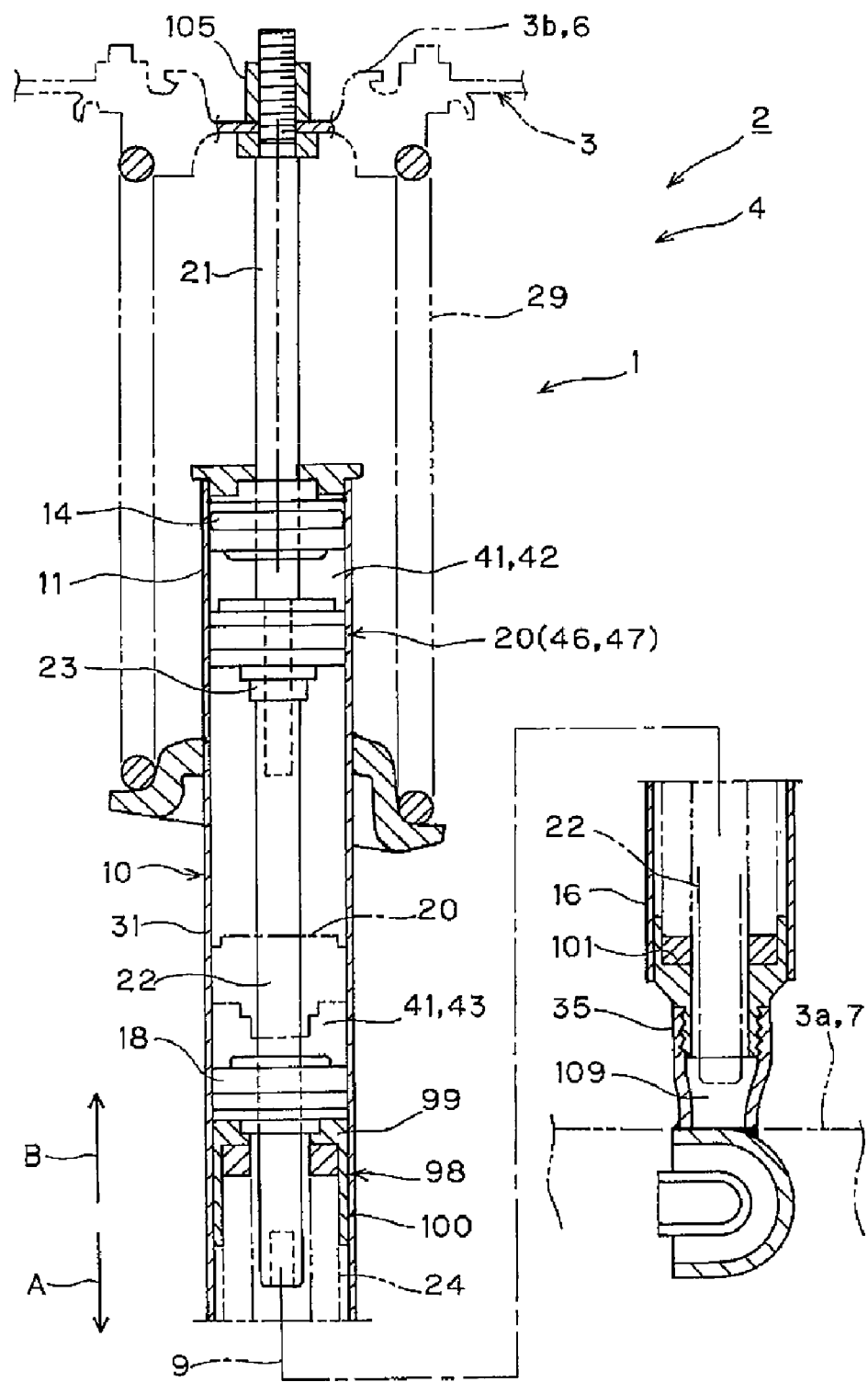
FIG. 12 is similar to FIG. 1, according to a sixth preferred embodiment of the present invention.

As shown in FIG. 12, the sixth preferred embodiment preferably has generally the same construction as the fifth preferred embodiment. However, the spring 24 in the fifth preferred embodiment is a coil spring having a rectangular or substantially rectangular cross section. Further, when the damper 1 performs the contraction operation B, the extended end of the sub-piston rod 22 can move in an inner space 109 of the connecting section 35 (indicated by an alternate long and short dash line in FIG. 12).

Seventh Preferred Embodiment

A seventh preferred embodiment of the present invention will be described herein after in further detail with reference to FIG. 13.

Figure 13:
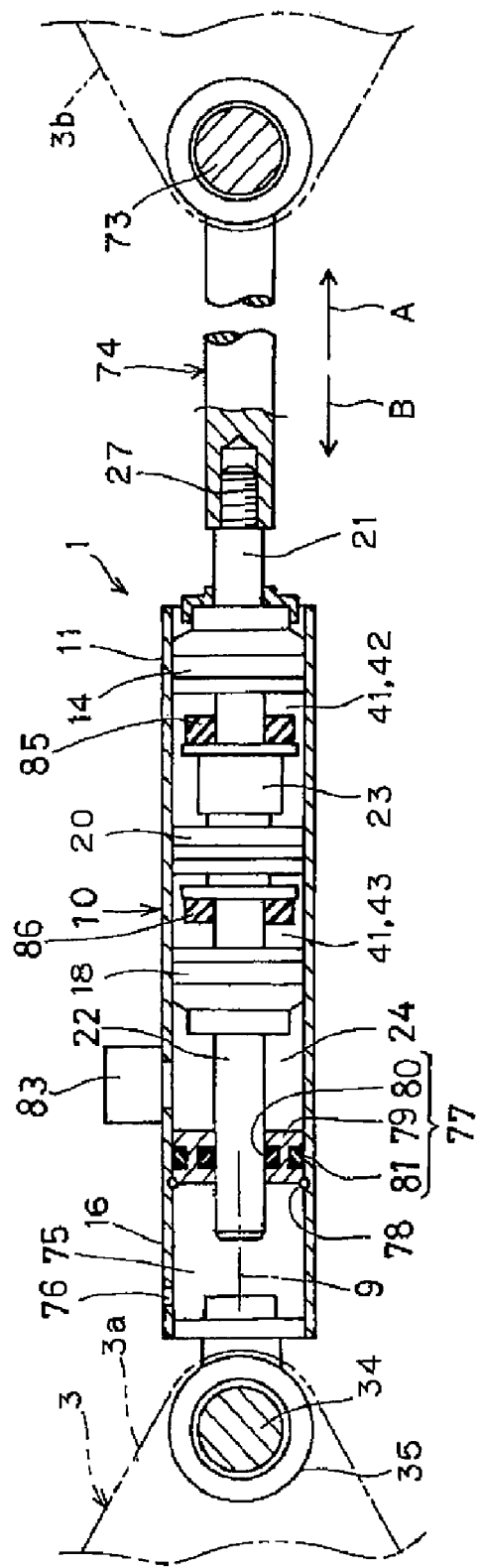
FIG. 13 is similar to FIG. 1, according to a seventh preferred embodiment of the present invention.

In FIG. 13, the seventh preferred embodiment preferably has generally the same construction and performs generally the same operation as the second preferred embodiment. However, a bulkhead 77 in the shape of an annulus ring defining an inner space of the cylinder tube 10 between the movable rod guide 18 and the base of the connecting section 35 into two chambers is provided. The bulkhead 77 is fixed on the cylinder tube 10 by a circlip 78. The sub-piston rod 22 is axially movably fitted in an inner hole of the bulkhead 77.

The bulkhead 77 is provided with a bulkhead main body 79 in the shape of an annulus ring positioned coaxially with the axial center 9, a seal body 80 provided with an O-ring attached on the outer circumference of the bulkhead main body 79 and sealing a space between the outer circumference of the bulkhead main body 79 and the inner circumference of the cylinder tube 10, and a seal body 81 provided with an O-ring attached on the inner circumference of the bulkhead main body 79 and sealing a space between the inner circumference of the bulkhead main body 79 and the outer circumference of the sub-piston rod 22.

A space enclosed by the movable rod guide 18 and the bulkhead 77 in the cylinder tube 10 is a sealed space. High-pressure nitrogen gas is filled in the space, which functions as the spring 24. A gas inlet 83 is attached on the cylinder tube 10. Gas can be injected into the sealed space in the cylinder tube 10 from the gas inlet 83.

The damper 1 in the seventh preferred embodiment damps micro-vibrations starting to occur between the first portion 3a and the second portion 3b of the member 3 in the same manner as the damper 1 in the second preferred embodiment. While micro-vibrations are damped, the sub-piston rod 22 repeats reciprocating movement in the axial direction in relation to the bulkhead 77. The stroke of the reciprocating movement is small. Accordingly, the slide of the sub-piston rod 22 in relation to the seal body 80 as an O-ring is minimal. Movement of the sub-piston rod 22 is permitted by elastic deformation of the seal body 80. Consequently, even if lubricant is not applied between the sub-piston rod 22 and the seal body 80, it is prevented that wear between the sub-piston rod 22 and the seal body 80 occurs at an early stage.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A damper comprising:
    a cylinder tube having a first end arranged to be connected to a first portion of a member to be damped;
    a fixing rod guide arranged to close a second end of the cylinder tube;
    a movable rod guide axially and slidably fitted on the first end of the cylinder tube;
    a piston axially and slidably fitted in a middle section in an axial direction of the cylinder tube;
    a main piston rod extending from the piston, passing through the fixing rod guide, and arranged to be connected to a second portion of the member to be damped;
    a sub-piston rod extending from the piston and passing through the movable rod guide; and
    a spring disposed coaxially with an axial center of the cylinder tube and normally biasing the movable rod guide toward the piston; wherein
    a first oil chamber is defined between the fixing rod guide and the piston;
    a second oil chamber is defined between the movable rod guide and the piston;
    a damping force generation oil passage connects the first and the second oil chambers;
    the cylinder tube includes a connecting section arranged to connect the first end of the cylinder tube to the first portion of the member to be damped, and an end of the sub-piston rod opposite to the piston is movable into the connecting section;

an elastic body including an admission hole is provided in the first portion of the member to be damped and the end of the sub-piston rod opposite to the piston is movable into the admission hole; and the connecting section extends in the axial direction of the cylinder tube and is inserted into the admission hole.

2. The damper according to claim 1, wherein the connecting section is open, in the axial direction of the cylinder tube, to an outside of the first end of the cylinder tube.

3. The damper according to claim 1, further comprising:

a regulating valve arranged to adjust an opening of the damping force generation oil passage provided on the axial center of the sub-piston rod; and an operation rod fitted in an axial center hole on the axial center of the sub-piston rod, the operation rod having a first end connected to the regulating valve and a second end as an operating section; wherein an operation hole arranged to allow the operating section to be operated outside of the first end is provided on the first end of the cylinder tube.

4. The damper according to claim 1, wherein a trajectory of the sub-piston rod is contained in an internal space of the cylinder tube when the damper performs an expansion operation or a contraction operation.

5. The damper according to claim 1, wherein the spring is a coil spring, and a trajectory of the sub-piston rod is contained in a space of the spring at a time when the damper performs the expansion operation or the contraction operation.

6. The damper according to claim 1, further comprising a slider interposed between the movable rod guide and the spring, the slider having a predetermined length in the axial direction of the cylinder tube and axially and slidably fitted in the cylinder tube.

* * * * *